United States Patent
Kakinuma

(10) Patent No.: US 10,020,831 B2
(45) Date of Patent: Jul. 10, 2018

(54) MICROWAVE RECEIVER AND MAGNETORESISTIVE DEVICE

(71) Applicant: TDK CORPORATION, Tokyo (JP)

(72) Inventor: Yuji Kakinuma, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/215,380

(22) Filed: Jul. 20, 2016

(65) Prior Publication Data

US 2017/0026207 A1    Jan. 26, 2017

(30) Foreign Application Priority Data

Jul. 21, 2015  (JP) .................................. 2015-143565
Jul. 14, 2016  (JP) .................................. 2016-139252

(51) Int. Cl.
| | | |
|---|---|---|
| *H04B 1/26* | (2006.01) | |
| *H04L 25/06* | (2006.01) | |
| *H04L 27/22* | (2006.01) | |
| *H04L 27/34* | (2006.01) | |
| *H04B 1/28* | (2006.01) | |

(52) U.S. Cl.
CPC ............... *H04B 1/28* (2013.01); *H04L 25/06* (2013.01); *H04L 27/22* (2013.01); *H04L 27/34* (2013.01)

(58) Field of Classification Search
CPC ....... H04L 27/063; H04L 27/18; H04L 27/22; H04L 27/34; H04L 25/02; H04L 25/06; H04B 1/16; H04B 1/26; G01R 33/091
See application file for complete search history.

(56) References Cited

U.S. PATENT DOCUMENTS

| | | | | |
|---|---|---|---|---|
| 2012/0025926 A1* | 2/2012 | Kakinuma | ............... | H03D 7/00 333/100 |
| 2015/0318823 A1* | 11/2015 | Park | ........................ | H03D 1/00 332/100 |
| 2016/0142012 A1* | 5/2016 | Wang | ................... | H03B 15/006 331/94.1 |

FOREIGN PATENT DOCUMENTS

| | | |
|---|---|---|
| JP | 2009-246615 A | 10/2009 |
| JP | 2010-278713 A | 12/2010 |
| JP | 2013-065986 A | 4/2013 |
| WO | WO2013/147390 A1 * | 10/2013 |

OTHER PUBLICATIONS

Tulapurkar et al., "Spin-torque diode effect in magnetic tunnel junctions," Nature, vol. 438, No. 7066, pp. 339-342, Nov. 17, 2005.

(Continued)

*Primary Examiner* — Betsy Deppe
(74) *Attorney, Agent, or Firm* — Oliff PLC

(57) ABSTRACT

A microwave receiver includes a magnetoresistive element to which a microwave is input, a magnetic field application unit, and a DC bias current application unit. The magnetoresistive element includes a free magnetic layer, a fixed magnetic layer, and a nonmagnetic spacer layer interposed between the free magnetic layer and the fixed magnetic layer. The magnetic field application unit applies a magnetic field to the free magnetic layer. The DC bias current application unit applies a DC bias current to the magnetoresistive element, and includes an input terminal. The DC bias current is made variable by adjusting a DC voltage that is applied to the DC bias current application unit via the input terminal.

5 Claims, 16 Drawing Sheets

(56) References Cited

OTHER PUBLICATIONS

Suzuki et al., "Microwave Properties of Spin Injection Devices—Spontaneous Oscillation, Spin-Torque Diode Effect and Magnetic Noise," Magne, vol. 2, No. 6, pp. 282-290, 2007.
Miwa et al., "Highly sensitive nanoscale spin-torque diode," Nature Materials, vol. 10, No. 1038, pp. 1-7, Oct. 20, 2013.

* cited by examiner

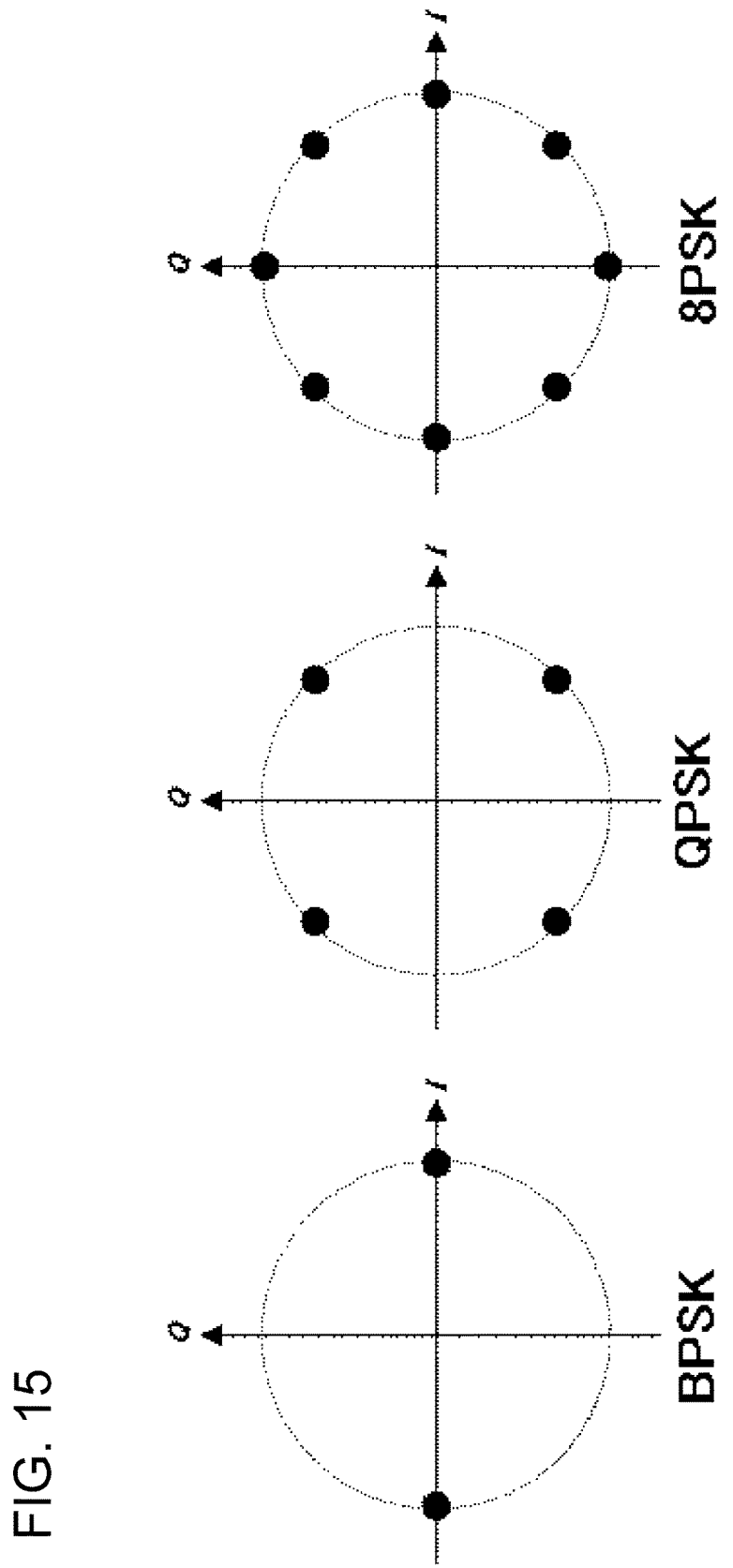

MICROWAVE RECEIVER AND MAGNETORESISTIVE DEVICE

BACKGROUND OF THE INVENTION

1. Field of the Invention

The present invention relates to a microwave receiver and a magnetoresistive device using a magnetoresistive element.

2. Description of the Related Art

With the recent advancement in ultrafine high-speed very large scale integration (VLSI) systems, a Gbps-range high-speed signal transmission technique and a 3D large scale integration (LSI) technique for stacking a plurality of functional chips become essential in order to increase the performance of the systems. Currently, Gbps-range high-speed signals are processed inside microprocessors; however, in an interface with an external memory and other chips, information is still transferred via a printed circuit board or wiring. Therefore, high-frequency components may be lost due to a band limitation caused by parasitic elements (R resistors, L inductors, and C capacitors) of the board, the wiring, and other transmission media, adjacent signal lines may interfere with each other, or an original signal might not be correctly reproduced.

Accordingly, as a technique for wirelessly connecting stacked multilayer semiconductor chips with each other or stacked printed circuit boards with each other, a technique has been proposed in which an antenna, a coil, a capacitor, or the like that is formed by using wiring of a semiconductor integrated circuit chip or an electronic circuit board is provided, and data communication using electromagnetically induced coupling between the stacked semiconductor chips or boards is performed therethrough.

For example, a multilayer semiconductor memory device having a large capacity has been developed in which a plurality of semiconductor flash memory chips are stacked so as to be externally controlled similarly as in the case of a single semiconductor memory. In a solid state drive (SSD) that replaces a magnetic hard disk and that uses nonvolatile memories, a plurality of identical flash memory chips are stacked to thereby increase the storage capacity. A technique for wirelessly connecting the stacked multilayer semiconductor flash memory chips with each other is being developed; however, a sufficient data communication speed for transmitting a large amount of information without delay has not been achieved. For the data communication, a Gbps-range signal transmission speed is desirable. To achieve this, proposals have been made, such as, using a high-frequency carrier wave beyond 10 GHz, performing simultaneous communication by providing a plurality of antennas or other radio transmission units, and employing a communication scheme using multilevel symbols. However, a direction to be followed in the future has yet to be decided.

As a magnetoresistive element, a tunnel magnetoresistive (TMR) element constituted by a fixed magnetic layer, a free magnetic layer, and a spacer layer formed of a nonmagnetic material and interposed therebetween is known. In this TMR element, spin-polarized electrons flow in response to a flow of an electric current, and the direction of magnetization of the free magnetic layer (the direction of electron spin) changes in accordance with the number of spin-polarized electrons accumulated in the free magnetic layer. In a case where the free magnetic layer is disposed in a constant magnetic field, when the direction of magnetization thereof is to be changed, a torque is exerted on electron spin so as to initiate restoration in a stable direction bound by the magnetic field. When a specific force causes a tremble, a vibration called spin precession occurs.

Recently, a phenomenon (spin-torque ferromagnetic resonance) has been found in which in a case where an AC current having a high frequency flows through a magnetoresistive element, such as a TMR element, strong resonance occurs when the frequency of the AC current flowing through the free magnetic layer matches the frequency of spin precession in the direction of magnetization (see Nature, Vol. 438, 17 Nov. 2005, pp. 339-342). It is known that in a state where a static magnetic field is externally applied to a magnetoresistive element and the direction of the static magnetic field is tilted relative to the direction of magnetization of the fixed magnetic layer by a predetermined angle within the layer, when an RF current (an RF current having a frequency that matches the frequency (resonance frequency) of spin precession) is injected, the magnetoresistive element exerts a function of generating a DC voltage proportional to the square of the frequency of the injected RF current at both ends thereof, that is, a squared detection function (spin-torque diode effect). It is also known that squared detection output of the magnetoresistive element exceeds squared detection output of a semiconductor P-N junction diode under a certain condition (see MAGNE, Vol. 2, No. 6, 2007, pp. 282-290).

The present applicant has focused on the squared detection function of a magnetoresistive element, studied the use of the function for a mixer that is operable with a low local power, and made proposals (see Japanese Unexamined Patent Application Publication Nos. 2009-246615 and 2010-278713). The present applicant has further proposed a mixer having a function of a frequency selection filter by using the squared detection function of a magnetoresistive element and a fact that an output multiplication signal changes in accordance with a resonance peak (see Japanese Unexamined Patent Application Publication No. 2013-65986).

It is known from recent research on a spin-torque diode that by applying an external magnetic field in a state where the external magnetic field is tilted relative to a direction perpendicular to a film surface by a slight angle and further applying a DC bias current, a diode property that exceeds that of a semiconductor diode is achieved (see S. Miwa, et al., Nature Materials, 10, 1038, (2013)). Specifically, in a case where a DC bias current is applied, the diode sensitivity of a spin-torque diode is 12000 [mV/mW] that far exceeds the diode sensitivity of a semiconductor diode, which is 500 [mV/mW]. In high-frequency application, by applying a DC bias current to a magnetoresistive element as described above, detection output of a diode and multiplication output of a mixer are expected to significantly increase, and industrial application is anticipated.

Detection output of a spin-torque diode or multiplication output of a spin-torque diode mixer in a microwave receiver using the above-described existing magnetoresistive element has a magnitude that may vary due to a disturbance or other factors.

SUMMARY OF THE INVENTION

Accordingly, an object of the present invention is to provide a microwave receiver and a magnetoresistive device in which detection output of a spin-torque diode or multiplication output of a spin-torque diode mixer can be adjusted even if the amplitude or phase of a microwave input to a magnetoresistive element is distorted.

In order to achieve the above-described object, a microwave receiver according to an aspect of the present invention is a microwave receiver including: a magnetoresistive element to which a microwave is input, the magnetoresistive element including a free magnetic layer, a fixed magnetic layer, and a nonmagnetic spacer layer interposed between the free magnetic layer and the fixed magnetic layer; a magnetic field application unit that applies a magnetic field to the free magnetic layer; and a DC bias current application unit that applies a DC bias current to the magnetoresistive element, the DC bias current application unit including an input terminal. The DC bias current is made variable by adjusting a DC voltage that is applied to the DC bias current application unit via the input terminal.

According to the above-described feature, the DC bias current that is applied to the magnetoresistive element is made variable by adjusting the DC voltage that is applied via the input terminal included in the DC bias current application unit. Therefore, it is possible to provide a microwave receiver in which detection output of the magnetoresistive element, which functions as a spin-torque diode, or multiplication output of the magnetoresistive element, which functions as a spin-torque diode mixer, is adjusted.

In the microwave receiver described above, the magnetoresistive element may detect the microwave and generate a first DC electromotive voltage; an electric current associated with the first DC electromotive voltage may be divided into an electric current that passes through an inductor and a feedback signal line and is injected into the DC bias current application unit and an electric current that is output to a subsequent circuit; the first DC electromotive voltage may be supplied to the DC bias current application unit via the inductor and the feedback signal line; and the DC bias current application unit may adjust the DC bias current so as to keep the first DC electromotive voltage constant.

According to the above-described feature, the magnetoresistive element detects the microwave and generates the first DC electromotive voltage, the first DC electromotive voltage is supplied to the DC bias current application unit, and the DC bias current is adjusted so as to keep the first DC electromotive voltage constant. Therefore, it is possible to make detection output of the magnetoresistive element constant even if the magnitude of the microwave that is input to the magnetoresistive element varies.

In the microwave receiver described above, the microwave may include a multilevel symbol transmission signal that is transmitted on two orthogonal carrier waves, which are an I-phase carrier wave and a Q-phase carrier wave; the microwave receiver may further include a local oscillator that generates a local wave having a frequency different from a frequency of the multilevel symbol transmission signal; the local wave may be input to the magnetoresistive element; the magnetoresistive element may generate a second DC electromotive voltage when outputting a multiplication signal obtained by multiplying the multilevel symbol transmission signal by the local wave; an electric current associated with the multiplication signal may be divided into an electric current that passes through an inductor and a feedback signal line and is injected into the DC bias current application unit and an electric current that is output to a subsequent circuit; the second DC electromotive voltage may be supplied to the DC bias current application unit via the inductor and the feedback signal line; and the DC bias current application unit may adjust the DC bias current so as to keep the second DC electromotive voltage constant.

According to the above-described feature, the magnetoresistive element generates the second DC electromotive voltage when outputting the multiplication signal obtained by multiplying the multilevel symbol transmission signal by the local wave, the second DC electromotive voltage is supplied to the DC bias current application unit, and the DC bias current is adjusted so as to keep the second DC electromotive voltage constant. Therefore, it is possible to make the multiplication signal output from the magnetoresistive element constant even if the magnitude of the microwave that includes the multilevel symbol transmission signal and that is input to the magnetoresistive element varies.

The microwave receiver described above may further include a demodulation filter; the multiplication signal may be input to the demodulation filter; the demodulation filter may include a first intermediate-frequency oscillator, a second intermediate-frequency oscillator, a first intermediate-frequency mixer, and a second intermediate-frequency mixer, the first intermediate-frequency oscillator generating an I-phase oscillation signal having a first frequency that is equal to a frequency difference between the multilevel symbol transmission signal and the local wave, the second intermediate-frequency oscillator generating a Q-phase oscillation signal having the first frequency; the first intermediate-frequency mixer may output an I-phase demodulation signal obtained by multiplying a signal included in the multiplication signal and having the first frequency by the I-phase oscillation signal; and the second intermediate-frequency mixer may output a Q-phase demodulation signal obtained by multiplying a signal included in the multiplication signal and having the first frequency by the Q-phase oscillation signal.

According to the above-described feature, the multiplication signal is input to the demodulation filter, the demodulation filter includes the first and second intermediate-frequency oscillators and the first and second intermediate-frequency mixers to output the I-phase demodulation signal and the Q-phase demodulation signal, and the multiplication signal output from the magnetoresistive element can be made constant by using the second DC electromotive voltage. Therefore, the output I-phase demodulation signal and Q-phase demodulation signal can also be made constant.

The microwave receiver described above may further include a demodulation filter; the microwave may include a multilevel symbol transmission signal that is transmitted on two orthogonal carrier waves, which are an I-phase carrier wave and a Q-phase carrier wave; the demodulation filter may include a local wave generator, a first magnetoresistive element, a second magnetoresistive element, a first DC bias current application unit, and a second DC bias current application unit, the local wave generator generating an I-phase local wave having a local wave frequency different from a frequency of the multilevel symbol transmission signal and a Q-phase local wave having the local wave frequency; the first magnetoresistive element and the second magnetoresistive element together functioning as the magnetoresistive element, the first DC bias current application unit and the second DC bias current application unit together functioning as the DC bias current application unit; the first DC bias current application unit may apply to the first magnetoresistive element a first DC bias current as the DC bias current; the second DC bias current application unit may apply to the second magnetoresistive element a second DC bias current as the DC bias current; the I-phase local wave may be input to the first magnetoresistive element; the first magnetoresistive element may generate a third DC electromotive voltage when outputting an I-phase demodulation signal obtained by multiplying the multilevel symbol transmission signal by the I-phase local wave; the Q-phase local wave may be input to the second magnetoresistive element; the second magnetoresistive element may generate a fourth DC electromotive voltage when outputting a Q-phase demodulation signal obtained by multiplying the multilevel symbol transmission signal by the Q-phase local wave; an electric current associated with the I-phase demodulation signal may be divided into an electric current that passes through a first inductor and a first feedback signal line and is injected into the first DC bias current application unit and an electric current that is output to a subsequent circuit; the third DC electromotive voltage may be supplied to the first DC bias current application unit via the first inductor and the first feedback signal line; the first DC bias current application unit may adjust the first DC bias current so as to keep the third DC electromotive voltage constant; an electric current associated with the Q-phase demodulation signal may be divided into an electric current that passes through a second inductor and a second feedback signal line and is injected into the second DC bias current application unit and an electric current that is output to a subsequent circuit; the fourth DC electromotive voltage may be supplied to the second DC bias current application unit via the second inductor and the second feedback signal line; and the second DC bias current application unit may adjust the second DC bias current so as to keep the fourth DC electromotive voltage constant.

According to the above-described feature, the demodulation filter includes the local wave generator that generates an I-phase local wave and a Q-phase local wave, the first and second magnetoresistive elements, and the first and second DC bias current application units, the third DC electromotive voltage is generated upon output of the I-phase demodulation signal, the fourth DC electromotive voltage is generated upon output of the Q-phase demodulation signal, the third and fourth DC electromotive voltages are supplied to the first and second DC bias current application units respectively, and the first and second DC bias currents are adjusted so as to keep the third and fourth DC electromotive voltages constant. Therefore, it is possible to make the output I-phase demodulation signal and Q-phase demodulation signal constant even if the magnitude of the microwave that includes the multilevel symbol transmission signal and that is input to the magnetoresistive element varies, the multilevel symbol transmission signal being transmitted on two orthogonal carrier waves, which are an I-phase carrier wave and a Q-phase carrier wave.

In the microwave receiver described above, the microwave may include a multilevel symbol transmission signal that is transmitted on two orthogonal carrier waves, which are an I-phase carrier wave and a Q-phase carrier wave; the multilevel symbol transmission signal may include a pilot symbol based on BPSK that is allocated to an information transmission frame based on a quadrature amplitude modification scheme; the microwave receiver may further include a local oscillator, a demodulation filter, and a baseband controller, the local oscillator generating a local wave having a frequency different from a frequency of the multilevel symbol transmission signal; the local wave may be input to the magnetoresistive element; the magnetoresistive element may output a multiplication signal obtained by multiplying the multilevel symbol transmission signal by the local wave; the multiplication signal may be input to the demodulation filter; the demodulation filter may include a first intermediate-frequency oscillator, a second intermediate-frequency oscillator, a first intermediate-frequency mixer, and a second intermediate-frequency mixer, the first intermediate-frequency oscillator generating an I-phase oscillation signal having a first frequency that is equal to a frequency difference between the multilevel symbol transmission signal and the local wave, the second intermediate-frequency oscillator generating a Q-phase oscillation signal having the first frequency; the first intermediate-frequency mixer may output an I-phase demodulation signal obtained by multiplying a signal included in the multiplication signal and having the first frequency by the I-phase oscillation signal; the second intermediate-frequency mixer may output a Q-phase demodulation signal obtained by multiplying a signal included in the multiplication signal and having the first frequency by the Q-phase oscillation signal; the baseband controller may include an analog-to-digital converter and a digital signal processor; the analog-to-digital converter may perform analog-to-digital conversion on the I-phase demodulation signal and the Q-phase demodulation signal; the digital signal processor may extract an I-phase amplitude value of the pilot symbol on the basis of the I-phase demodulation signal and the Q-phase demodulation signal subjected to the analog-to-digital conversion and output a fifth DC voltage corresponding to the I-phase amplitude value; the fifth DC voltage may be supplied to the DC bias current application unit via a feedback signal line; and the DC bias current application unit may adjust the DC bias current so as to keep the fifth DC voltage constant.

According to the above-described feature, the demodulation filter includes the first and second intermediate-frequency oscillators and the first and second intermediate-frequency mixers to output the I-phase demodulation signal and the Q-phase demodulation signal, the digital signal processor extracts the I-phase amplitude value of a pilot symbol included in the microwave input to the magnetoresistive element on the basis of the I-phase demodulation signal and the Q-phase demodulation signal subjected to analog-to-digital conversion and outputs the fifth DC voltage corresponding to the I-phase amplitude value, the fifth DC voltage is supplied to the DC bias current application unit via the feedback signal line, and the DC bias current is adjusted so as to keep the fifth DC voltage constant. Therefore, it is possible to make the output I-phase demodulation signal and Q-phase demodulation signal constant even if the magnitude of the microwave that includes the multilevel symbol transmission signal and that is input to the magnetoresistive element varies, the multilevel symbol transmission signal being transmitted on two orthogonal carrier waves, which are an I-phase carrier wave and a Q-phase carrier wave.

The microwave receiver described above may further include a demodulation filter and a baseband controller; the microwave may include a multilevel symbol transmission signal that is transmitted on two orthogonal carrier waves, which are an I-phase carrier wave and a Q-phase carrier wave; the multilevel symbol transmission signal may include a pilot symbol based on BPSK that is allocated to an information transmission frame based on a quadrature amplitude modification scheme; the demodulation filter may include a local wave generator, a first magnetoresistive element, a second magnetoresistive element, a first DC bias current application unit, and a second DC bias current application unit, the local wave generator generating an I-phase local wave having a local wave frequency different from a frequency of the multilevel symbol transmission signal and a Q-phase local wave having the local wave frequency, the first magnetoresistive element and the second magnetoresistive element together functioning as the magnetoresistive element, the first DC bias current application unit and the second DC bias current application unit together functioning as the DC bias current application unit; the first DC bias current application unit may apply to the first magnetoresistive element a first DC bias current as the DC bias current; the second DC bias current application unit may apply to the second magnetoresistive element a second DC bias current as the DC bias current; the I-phase local wave may be input to the first magnetoresistive element; the first magnetoresistive element may output an I-phase demodulation signal obtained by multiplying the multilevel symbol transmission signal by the I-phase local wave; the Q-phase local wave may be input to the second magnetoresistive element; the second magnetoresistive element may output a Q-phase demodulation signal obtained by multiplying the multilevel symbol transmission signal by the Q-phase local wave; the baseband controller may include an analog-to-digital converter and a digital signal processor; the analog-to-digital converter may perform analog-to-digital conversion on the I-phase demodulation signal and the Q-phase demodulation signal; the digital signal processor may extract an I-phase amplitude value of the pilot symbol on the basis of the I-phase demodulation signal and the Q-phase demodulation signal subjected to the analog-to-digital conversion and output a fifth DC voltage corresponding to the I-phase amplitude value; the fifth DC voltage may be supplied to the first DC bias current application unit via a feedback signal line; the first DC bias current application unit may adjust the first DC bias current so as to keep the fifth DC voltage constant; and the second DC bias current application unit may adjust the second DC bias current so as to correspond to the first DC bias current.

According to the above-described feature, the demodulation filter includes the local wave generator that generates an I-phase local wave and a Q-phase local wave, the first and second magnetoresistive elements, and the first and second DC bias current application units to output the I-phase demodulation signal and the Q-phase demodulation signal, the digital signal processor extracts the I-phase amplitude value of a pilot symbol included in the microwave input to the magnetoresistive element on the basis of the I-phase demodulation signal and the Q-phase demodulation signal subjected to analog-to-digital conversion and outputs the fifth DC voltage corresponding to the I-phase amplitude value, the fifth DC voltage is supplied to the first DC bias current application unit via the feedback signal line, the first DC bias current is adjusted so as to keep the fifth DC voltage constant, and the second DC bias current is adjusted so as to correspond to the first DC bias current. Therefore, it is possible to make the output I-phase demodulation signal and Q-phase demodulation signal constant even if the magnitude of the microwave that includes the multilevel symbol transmission signal and that is input to the magnetoresistive element varies, the multilevel symbol transmission signal being transmitted on two orthogonal carrier waves, which are an I-phase carrier wave and a Q-phase carrier wave.

A magnetoresistive device according to an aspect of the present invention is a magnetoresistive device including: a magnetoresistive element to which a microwave is input, the magnetoresistive element including a free magnetic layer, a fixed magnetic layer, and a nonmagnetic spacer layer interposed between the free magnetic layer and the fixed magnetic layer; a magnetic field application unit that applies a magnetic field to the free magnetic layer; and a DC bias current application unit that applies a DC bias current to the magnetoresistive element, the DC bias current application unit including an input terminal. The DC bias current is made variable by adjusting a DC voltage that is applied to the DC bias current application unit via the input terminal.

In the magnetoresistive device described above, the magnetoresistive element may detect the microwave and generate a sixth DC electromotive voltage; an electric current associated with the sixth DC electromotive voltage may be divided into an electric current that passes through an inductor and a feedback signal line and is injected into the DC bias current application unit and an electric current that is output to a subsequent circuit; the sixth DC electromotive voltage may be supplied to the DC bias current application unit via the inductor and the feedback signal line; and the DC bias current application unit may adjust the DC bias current so as to keep the sixth DC electromotive voltage constant.

According to aspects of the present invention, it is possible to provide a microwave receiver and a magnetoresistive device in which detection output of a spin-torque diode or multiplication output of a spin-torque diode mixer can be adjusted even if the amplitude or phase of a microwave input to a magnetoresistive element is distorted.

BRIEF DESCRIPTION OF THE DRAWINGS

FIG. 14A is a spectral diagram of a 2 GHz microwave signal S1 and a 2.05 GHz local oscillation signal S2 and FIG. 14B is a spectral diagram of a 50 MHz multiplication signal S4.

FIG. 15 includes constellation diagrams of phase shift keying (PSK) schemes, namely, binary phase shift keying (BPSK), quadrature phase shift keying (QPSK), and 8-phase shift keying (8PSK).

DESCRIPTION OF THE PREFERRED EMBODIMENTS

Figure 1:
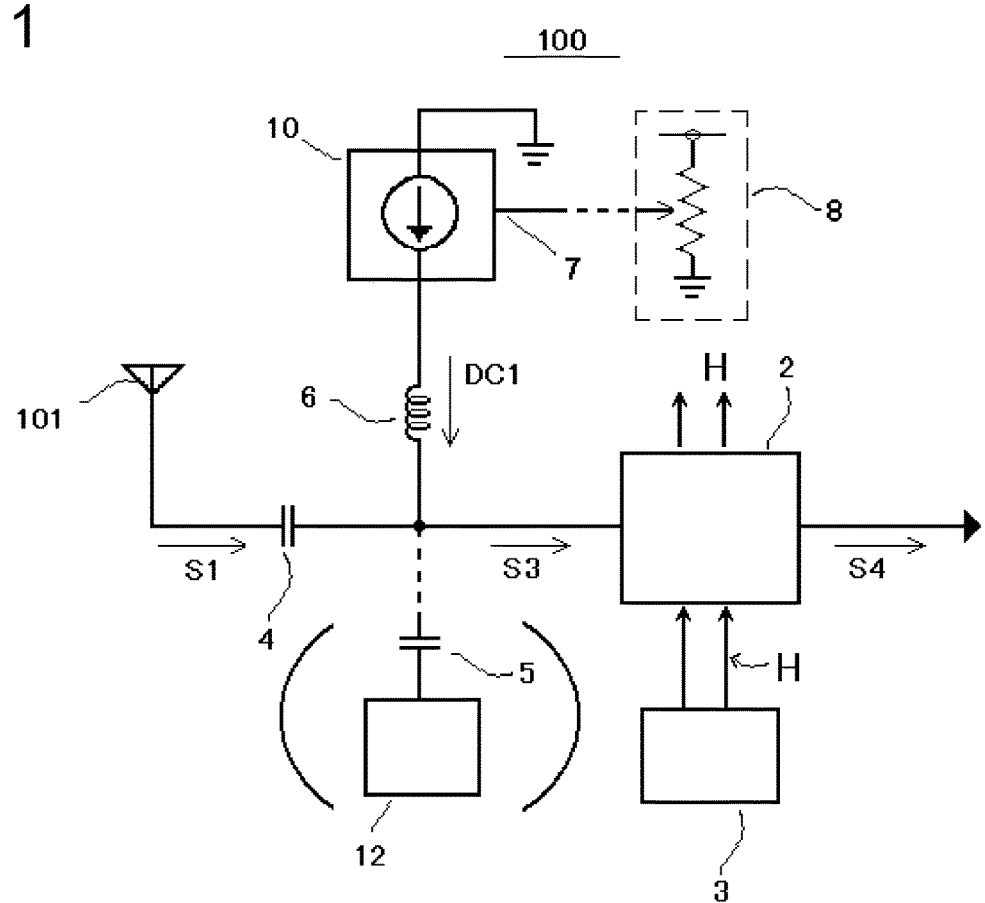
FIG. 1 is a circuit diagram of a microwave receiver according to a first embodiment of the present invention.

Hereinafter, exemplary embodiments of the present invention will be described with reference to the drawings. Note that a description given below illustrates some of the embodiments of the present invention, and the present invention is not limited to the embodiments described below. Any embodiment based on the technical idea of the present invention is included in the scope of the present invention. Components and combinations thereof in the embodiments are examples, and any component may be added, omitted, replaced, or modified without departing from the spirit of the present invention. Components having a similar configuration in the embodiments are given the same reference numerals and a description thereof may be omitted as appropriate.

FIG. 1 is a circuit diagram of a microwave receiver 100 according to a first embodiment of the present invention. The microwave receiver 100 includes a magnetoresistive element 2 to which a microwave signal S1 received by an antenna element 101 is input. The magnetoresistive element 2 includes a free magnetic layer 21, a fixed magnetic layer 23, and a nonmagnetic spacer layer 22 interposed between the free magnetic layer 21 and the fixed magnetic layer 23 (see FIG. 2). The microwave receiver 100 further includes a magnetic field application unit 3 that applies a magnetic field to the free magnetic layer 21 and a DC bias current application unit 10 that applies a DC bias current DC1 to the magnetoresistive element 2. The DC bias current application unit 10 includes an input terminal 7, and a DC voltage to be applied to the DC bias current application unit 10 via the input terminal 7 is adjusted to thereby change the DC bias current DC1. That is, the microwave receiver 100 includes the magnetoresistive element 2, the magnetic field application unit 3, and the DC bias current application unit 10 for detecting or mixing the microwave signal S1 received by the antenna element 101. In a case of causing the magnetoresistive element 2 to function as a spin-torque diode mixer, the microwave receiver 100 includes a local oscillator 12 and a capacitor 5. In a case of causing the magnetoresistive element 2 to function as a detector, the local oscillator 12 and the capacitor 5 are not necessary. The microwave signal S1 received by the antenna element 101 passes through a capacitor 4 and is input to the magnetoresistive element 2. In the case of causing the magnetoresistive element 2 to function as a spin-torque diode mixer, a local wave generated by the local oscillator 12 passes through the capacitor 5 and is input to the magnetoresistive element 2. To the magnetoresistive element 2, an appropriate magnetic field H is applied by the magnetic field application unit 3, and detection output or multiplication output (S4 in FIG. 1) having a large value is obtained when an adjustment is made so that a desired frequency of the microwave signal S1 matches the frequency of ferromagnetic resonance with the magnetic field H of the magnetoresistive element 2. The microwave receiver 100 further includes an inductor 6 for cutting high frequencies, and the DC bias current DC1 can be applied to the magnetoresistive element 2 via the inductor 6. In a case where the DC bias current DC1 is applied to the magnetoresistive element 2, detection output or multiplication output (S4 in FIG. 1) having a larger value can be output than in a case of not applying the DC bias current DC1. The input terminal 7 of the DC bias current application unit 10 is connected to a DC voltage generator 8. The DC voltage generator 8 can generate any voltage and can adjust a DC voltage to be applied to the DC bias current application unit 10 via the input terminal 7. The microwave receiver 100 can change the DC bias current DC1 by adjusting the DC voltage to be applied to the DC bias current application unit 10 and can change detection output or multiplication output (S4 in FIG. 1) of the magnetoresistive element 2 as desired.

Figure 2:
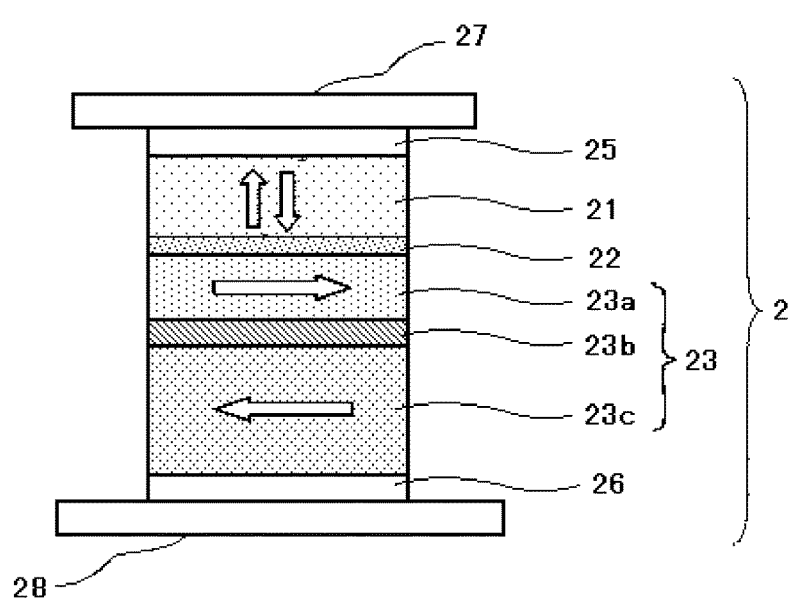
FIG. 2 is a cross-sectional view of a magnetoresistive element.

FIG. 2 illustrates a configuration of the magnetoresistive element 2 (TMR element) according to the first embodiment of the present invention. The magnetoresistive element 2 includes the free magnetic layer 21, the spacer layer 22, and the fixed magnetic layer 23. The magnetoresistive element 2 further includes a cap layer 25 and a buffer layer 26, as illustrated in FIG. 2. These layers are stacked between an upper electrode 27 and a lower electrode 28, and the upper electrode 27 and the lower electrode 28 are disposed while extending in the right-left direction as conductive wiring. The free magnetic layer 21 is magnetized in a direction normal to the film surface, and the fixed magnetic layer 23 is magnetized in in-plane directions along the film surface. Here, the free magnetic layer 21 is formed of a ferromagnetic material and is configured as a magnetosensitive layer. The spacer layer 22 is a nonmagnetic spacer layer, is formed of an insulating nonmagnetic material, and functions as a tunnel barrier layer. Note that the spacer layer 22 is usually formed so as to have a thickness of 1 nm or less. The lower electrode 28 is connected to ground. Examples of materials used for the free magnetic layer 21 and the fixed magnetic layer 23 include magnetic metals, such as Fe (iron), Co (cobalt), Ni (nickel), and Cr (chromium), and alloys made of magnetic alloys thereof and formed by mixing B (boron) in the magnetic alloys to decrease the saturation magnetization.

The fixed magnetic layer 23 includes a ferromagnetic layer (second magnetic layer) 23a in which the magnetization direction is fixed, a nonmagnetic layer 23b made of metal, such as Ru (ruthenium), and another ferromagnetic layer (first magnetic layer) 23c in which the magnetization direction is fixed so as to be opposite to that of the ferromagnetic layer 23a, and these layers are stacked so that the ferromagnetic layer 23c is positioned in contact with the upper portion of the buffer layer 26. As the layered configuration of the fixed magnetic layer 23, a multilayer film formed of CoFe (cobalt iron)-Ru (ruthenium)-CoFe (cobalt iron) can be used, for example.

The spacer layer 22 is preferably formed of a monocrystalline MgO layer or a polycrystalline MgOx ($0<x<1$) layer (hereinafter referred to as "MgO layer").

The free magnetic layer 21 is formed of a magnetic material having a high coercive force in a direction normal to the film surface while the coercive force is decreased by adjusting the composition ratio, adding impurities, or adjusting the thickness. The free magnetic layer 21 may be formed of a magnetic material, such as CoFeB (cobalt iron boron), and having a small anisotropy energy density, for example. It is preferable that the size of the free magnetic layer 21 be set to 200 nm×200 nm square or smaller in order to facilitate larger resonant motions in the free magnetic layer 21, and the element resistance value be made closer to 50Ω in terms of the DC resistance value in order to match a high-frequency transmission circuit. Examples of the magnetoresistive element 2 include an element having a free magnetic layer that is in an isotropic magnetization state (the magnetization direction is directed upward by about 450 towards a direction normal to the film surface from the film surface direction due to crystalline magnetic anisotropy), being approximately 120 nm×120 nm round, having a resistance value of 120Ω in a nonmagnetic field, and having a magnetoresistance (MR) change percentage of about 70 to 80%.

Figure 3:
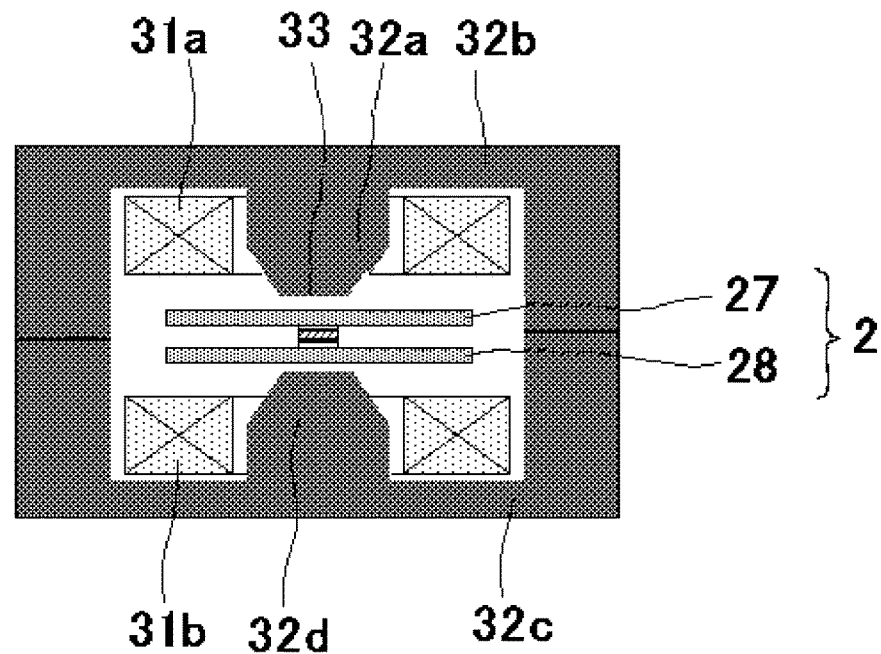
FIG. 3 is a cross-sectional view of a magnetic field application unit in which electromagnet coils are disposed above and below the magnetoresistive element.

FIG. 3 is a cross-sectional view of the magnetic field application unit 3 that applies a magnetic field in a direction normal to the film surface of the magnetoresistive element 2. The magnetoresistive element 2 includes the upper electrode 27 and the lower electrode 28 at the ends thereof respectively. The magnetic field application unit 3 includes an electromagnet coil 31a and an electromagnet coil 31b that are disposed above and below the magnetoresistive element 2 respectively, and magnetic field yokes 32b and 32c that surround the magnetoresistive element 2. By changing the coil currents that flow through the electromagnet coils 31a and 31b, the magnitude of the magnetic field that is applied to the magnetoresistive element 2 can be changed to shift the center frequency f0 of ferromagnetic resonance of the magnetoresistive element 2 to a target frequency band. The magnetic field application unit 3 may be configured by disposing permanent magnets above and below the magnetoresistive element 2 instead of the electromagnet coils 31a and 31b.

Figure 4:
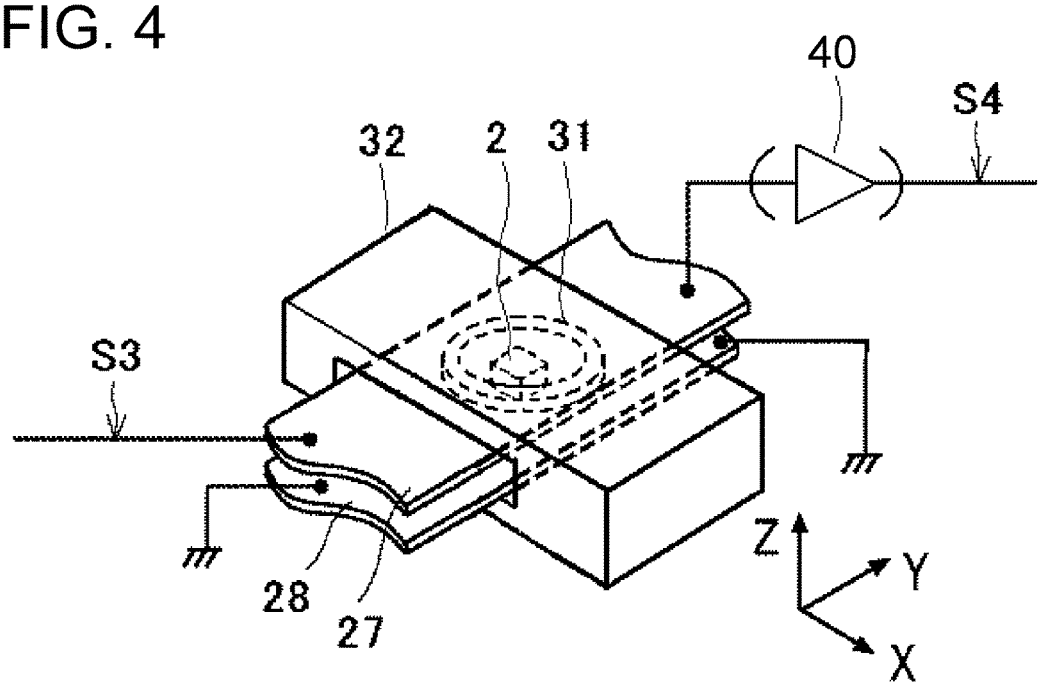
FIG. 4 is a diagram illustrating a configuration of the magnetic field application unit and the magnetoresistive element.

FIG. 4 illustrates the 3D structure of the magnetic field application unit 3. FIG. 4 illustrates a magnetic field yoke 32 in which the electromagnet coils 31a and 31b are disposed above and below the magnetoresistive element 2 respectively, and the upper electrode 27 and the lower electrode 28 of the magnetoresistive element 2 are disposed so as to pass through and cross the magnetic field yoke 32. The magnetoresistive element 2 and the electromagnet coil 31a disposed thereabove are represented by using hidden lines, and the electromagnet coil 31b disposed below is omitted in FIG. 4. An input signal S3 is applied to the upper electrode 27, an output signal S4 is extracted from the upper electrode 27, and the lower electrode 28 is connected to ground. An amplifier 40 is provided in a subsequent circuit from which the output signal S4 is extracted. In a case where the impedance of the subsequent circuit is high, the amplifier 40 need not be provided. For example, a DC electromotive voltage generated as a result of ferromagnetic resonance of the magnetoresistive element 2 undergoes attenuation to a small degree if the impedance of the subsequent circuit is 10 kΩ or more and undergoes rapid attenuation if the impedance is 1 kΩ or less.

Figure 5:
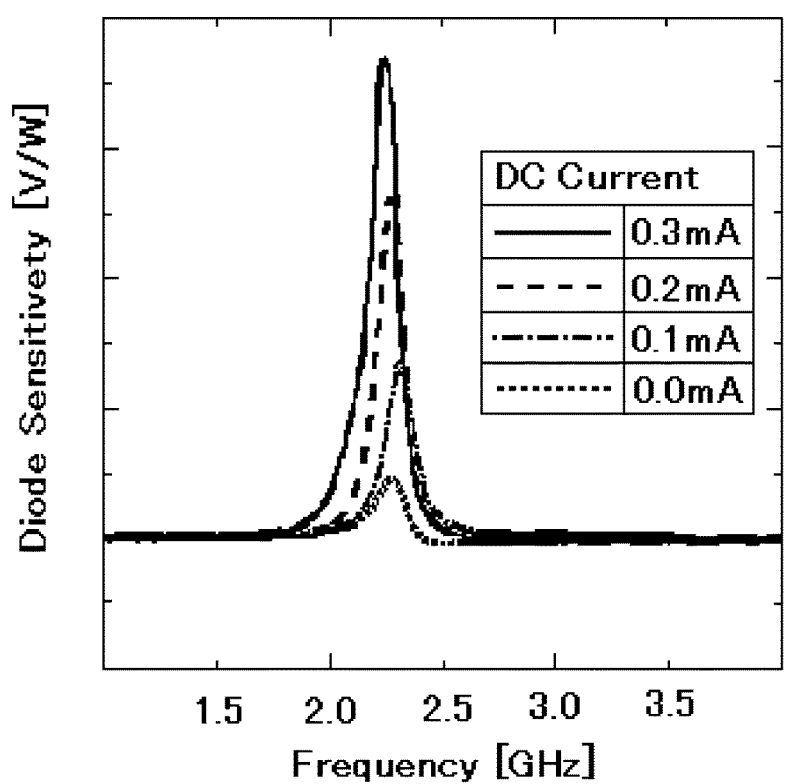
FIG. 5 is a diagram illustrating diode sensitivity when a DC bias current is superimposed.

FIG. 5 illustrates the diode sensitivity of a spin-torque diode effect when a DC bias current ranging from 0.1 mA to 0.3 mA is applied to the magnetoresistive element 2. The diode sensitivity is represented on a certain scale, and the diode sensitivity increases in the upper portion in FIG. 5. The diode sensitivity (the unit is [V/W]) is represented by (diode sensitivity=spin-torque diode voltage (DC voltage output from magnetoresistive element)/input RF power) and serves as a property index of diode detection. For example, the diode sensitivity of a spin-torque diode is 630 [mV/mW] when a DC bias current is not applied, and increases to 12000 [mV/mW], which is 15 to 20 times the above diode sensitivity, when a DC bias current is applied. The property index obtained from the diode sensitivity correlates to the magnitude of a multiplication signal output from the magnetoresistive element 2 in a case where the magnetoresistive element 2 is caused to function as a spin-torque diode mixer.

According to this embodiment, by adjusting a DC voltage to be applied via the input terminal 7 of the DC bias current application unit 10, the DC bias current DC1 that is applied to the magnetoresistive element 2 can be changed. Accordingly, it is possible to provide the microwave receiver 100 in which detection output of the magnetoresistive element 2, which functions as a spin-torque diode, or multiplication output of the magnetoresistive element 2, which functions as a spin-torque diode mixer, can be adjusted.

Figure 6:
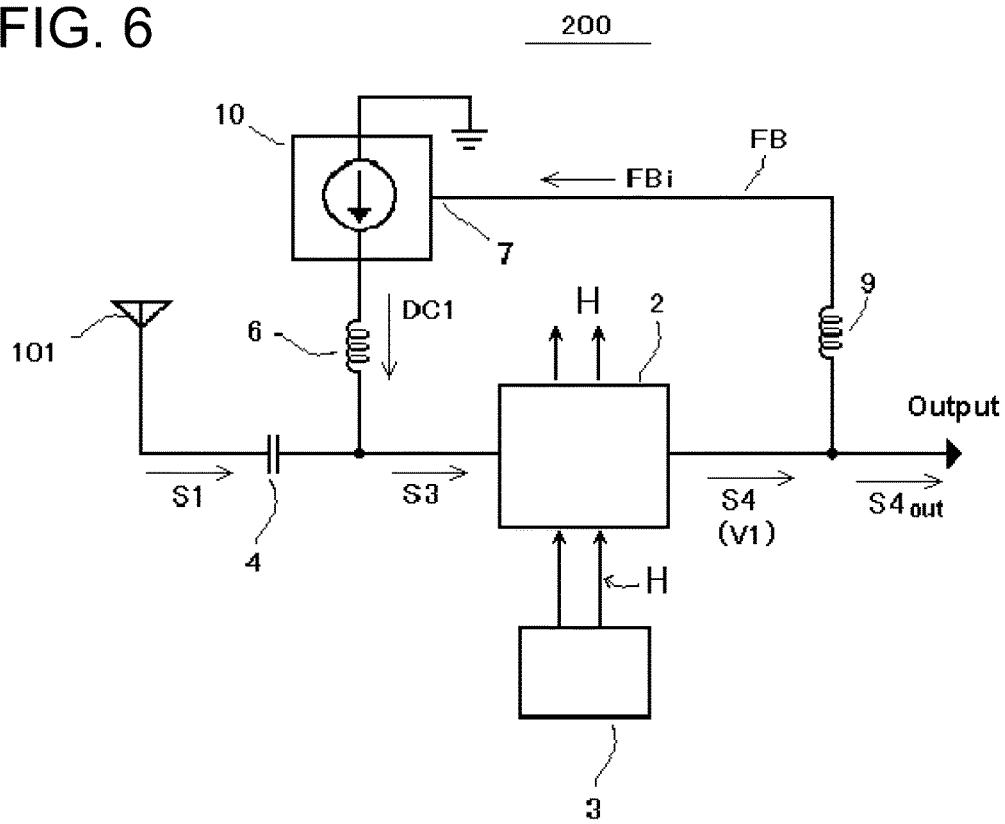
FIG. 6 is a circuit diagram of a microwave receiver according to a second embodiment of the present invention.

FIG. 6 is a circuit diagram of a microwave receiver 200 according to a second embodiment of the present invention. In the microwave receiver 200, the magnetoresistive element 2 detects a microwave signal S1 and generates a DC electromotive voltage V1. An electric current associated with the DC electromotive voltage V1 is divided into an electric current FBi that passes through an inductor 9 and a feedback signal line FB and is injected into the DC bias current application unit 10 and an electric current S4out that is output to a subsequent circuit. The DC electromotive voltage V1 is supplied to the DC bias current application unit 10 via the inductor 9 and the feedback signal line FB, and the DC bias current application unit 10 is configured to adjust the DC bias current DC1 so as to keep the DC electromotive voltage V1 constant. That is, in the microwave receiver 200, the microwave signal S1 received by the antenna element 101 passes through the capacitor 4, the DC bias current DC1 applied by the DC bias current application unit 10 passes through the inductor 6, a signal S3 formed by combining the microwave signal S1 and the DC bias current DC1 is input to the magnetoresistive element 2, the microwave signal S1 is detected by the magnetoresistive element 2, and detection output S4 is generated. An electric current associated with the detection output S4 is divided into the electric current FBi that passes through the inductor 9 and the feedback signal line FB and is injected into the DC bias current application unit 10 and the electric current S4out that is output to the subsequent circuit. From the detection output S4, the DC electromotive voltage V1 is extracted via the inductor 9, and the DC electromotive voltage V1 is supplied to the DC bias current application unit 10 via the feedback signal line FB. The DC bias current application unit 10 adjusts the DC bias current DC1 so as to keep the DC electromotive voltage V1 constant.

Therefore, even if the signal level of a microwave signal S1 received by the antenna element 101 and input to the magnetoresistive element 2 varies due to a disturbance or other factors, the magnetoresistive element 2 can keep outputting detection output S4 having a constant level, and automatic gain control can be implemented.

Figure 7:
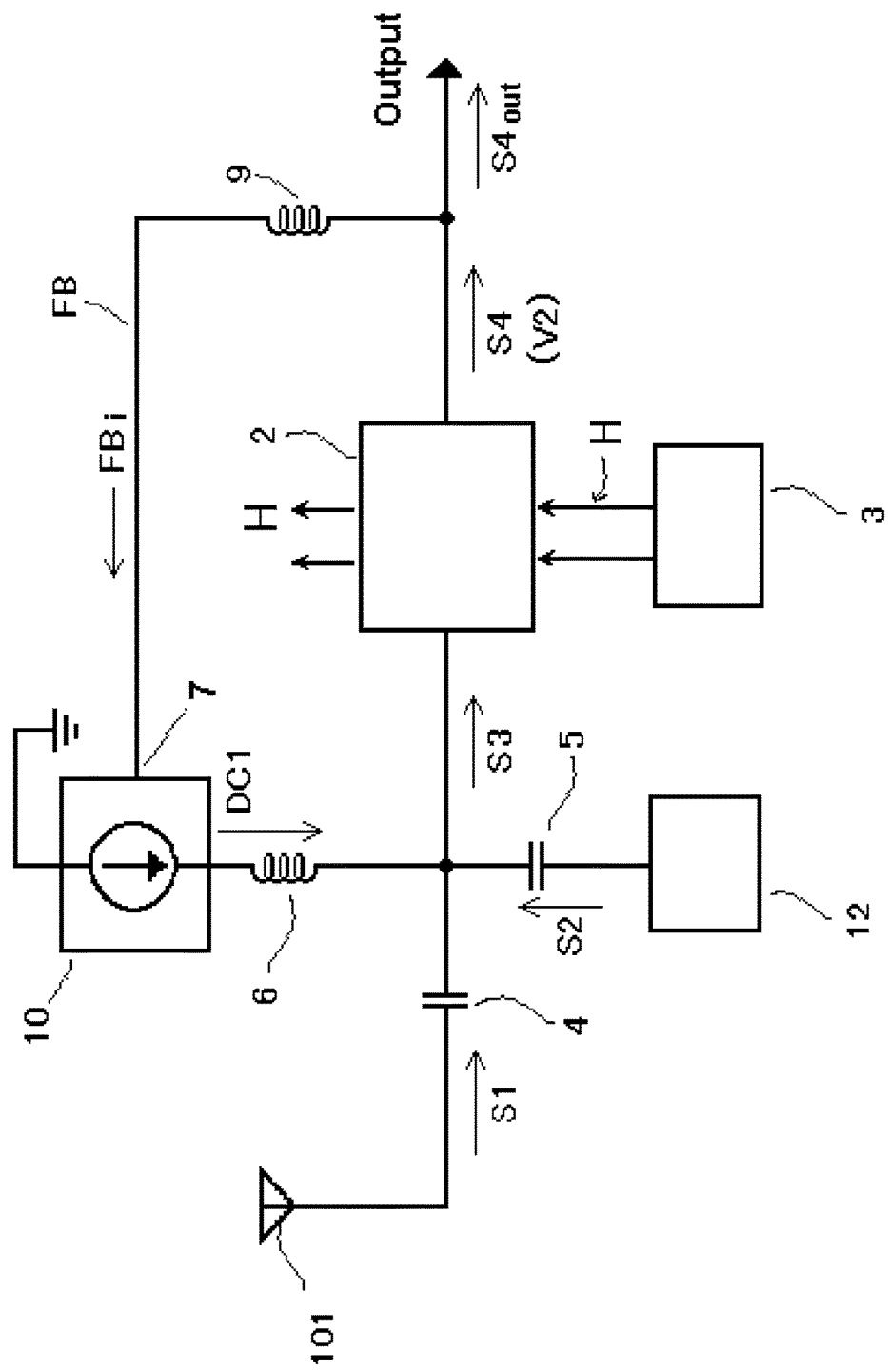
FIG. 7 is a circuit diagram of a microwave receiver according to a third embodiment of the present invention.

FIG. 7 is a circuit diagram of a microwave receiver 300 according to a third embodiment of the present invention. In the microwave receiver 300, a microwave signal S1 includes a multilevel symbol transmission signal that is transmitted on two orthogonal carrier waves, namely, an I-phase carrier wave and a Q-phase carrier wave. The microwave receiver 300 includes the local oscillator 12 that generates a local wave S2 having a frequency close to the center frequency of the multilevel symbol transmission signal. The local wave S2 is input to the magnetoresistive element 2. The magnetoresistive element 2 generates a DC electromotive voltage V2 when outputting a multiplication signal S4 obtained by multiplying the multilevel symbol transmission signal by the local wave S2. An electric current associated with the multiplication signal S4 is divided into an electric current FBi that passes through the inductor 9 and the feedback signal line FB and is injected into the DC bias current application unit 10 and an electric current S4out that is output to a subsequent circuit. The DC electromotive voltage V2 is supplied to the DC bias current application unit 10 via the inductor 9 and the feedback signal line FB. The DC bias current application unit 10 is configured to adjust the DC bias current DC1 so as to keep the DC electromotive voltage V2 constant. That is, in the microwave receiver 300, the microwave signal S1 that is received by the antenna element 101 and includes the multilevel symbol transmission signal and the local wave S2 generated by the local oscillator 12 pass through the capacitor 4 and the capacitor 5 respectively. The DC bias current DC1 applied by the DC bias current application unit 10 passes through the inductor 6. A signal S3 formed by combining the microwave signal S1, the local wave S2, and the DC bias current DC1 is input to the magnetoresistive element 2. A magnetic field H is applied to the magnetoresistive element 2 by the magnetic field application unit 3, ferromagnetic resonance occurs in a desired frequency band, and the magnetoresistive element 2 outputs the multiplication signal S4, which is obtained by multiplying the microwave signal S1 (RF signal having a frequency f1) by the local wave S2 (local signal having a frequency f2). A large number of intermediate-frequency signals (f1−f2) can be extracted from the multiplication signal S4 for the following reason. The magnetoresistive element 2 generates (f1+f2), (f1−f2), 2×f1, 2×f2, 3×f1, 3×f2, and so on as frequency components of the multiplication signal S4. When capacitors having a self-resonance property are appropriately selected as the capacitors 4 and 5, the frequency components f1, f2, (f1+f2), 2×f1, 2×f2, 3×f1, 3×f2, and so on having high frequencies are in a GHz band and can pass through the capacitors, while the frequency component (f1−f2) having a low frequency of a few tens of MHz is blocked by the capacitors. The frequency components f1, f2, (f1+f2), 2×f1, 2×f2, 3×f1, 3×f2, and so on having high frequencies reach an impedance of 50Ω at last and undergo attenuation to a large degree. In contrast, the frequency component (f1−f2) having a low frequency hardly undergoes attenuation and can be sent to the subsequent circuit. In the multiplication signal S4, intermediate-frequency signals having the low-frequency component (f1−f2) occupy a relatively large portion.

The electric current associated with the multiplication signal S4 is divided into the electric current FBi that passes through the inductor 9 and the feedback signal line FB and is injected into the DC bias current application unit 10 and the electric current S4out that is output to the subsequent circuit. From the multiplication output S4, the DC electromotive voltage V2 is extracted via the inductor 9, and the DC electromotive voltage V2 is supplied to the DC bias current application unit 10 via the feedback signal FB. The DC bias current application unit 10 adjusts the DC bias current DC1 so as to keep the DC electromotive voltage V2 constant. Therefore, even if the input signal level of a microwave signal S1 including a multilevel symbol transmission signal that is received by the antenna element 101 and is input to the magnetoresistive element 2 varies due to a disturbance or other factors, the magnetoresistive element 2 can keep outputting multiplication output S4 having a constant level, and automatic gain control can be implemented.

Figure 8:
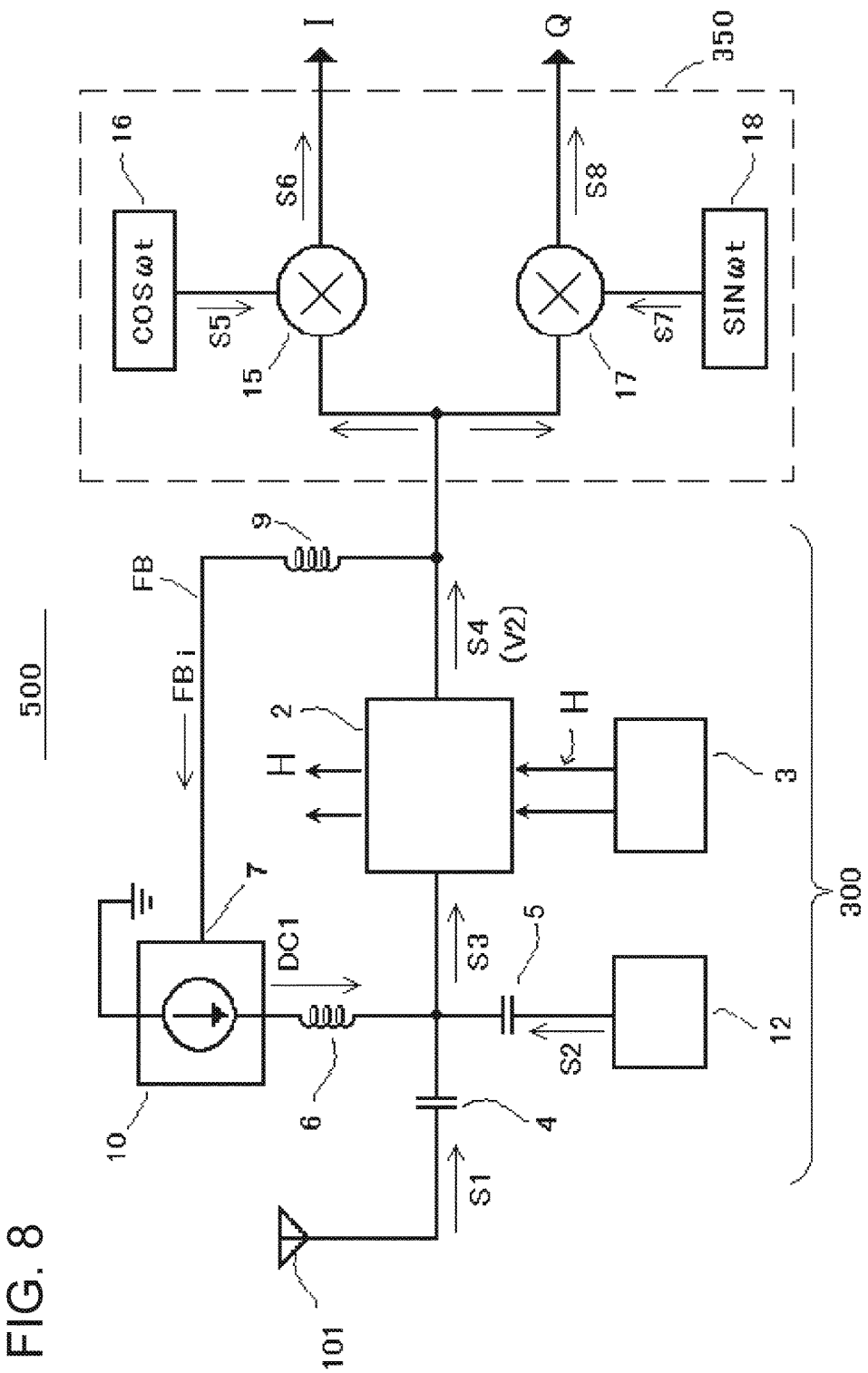
FIG. 8 is a circuit diagram of a microwave receiver according to a fourth embodiment of the present invention.

FIG. 8 is a circuit diagram of a microwave receiver 500 according to a fourth embodiment of the present invention. The microwave receiver 500 is configured by adding a demodulation filter 350 to the microwave receiver 300 of the third embodiment, and the multiplication signal S4 output from the microwave receiver 300 is input to the subsequent demodulation filter 350. The demodulation filter 350 includes a first intermediate-frequency oscillator 16 that generates an I-phase oscillation signal S5, a second intermediate-frequency oscillator 18 that generates a Q-phase oscillation signal S7 having a frequency equal to that of the I-phase oscillation signal S5 and having a phase advancing ahead of that of the I-phase oscillation signal S5 by 90°, a first intermediate-frequency mixer 15, and a second intermediate-frequency mixer 17. The first intermediate-frequency mixer 15 outputs an I-phase demodulation signal S6 obtained by multiplying the multiplication signal S4 by the I-phase oscillation signal S5, and the second intermediate-frequency mixer 17 outputs a Q-phase demodulation signal S8 obtained by multiplying the multiplication signal S4 by the Q-phase oscillation signal S7. In the microwave receiver 500, the magnetoresistive element 2 functions as a down-conversion-type mixer as in the third embodiment, and an electric current associated with the multiplication signal S4 output from the magnetoresistive element 2 is divided into an electric current FBi that passes through the inductor 9 and the feedback signal line FB and is injected into the DC bias current application unit 10 and an electric current that is input to the subsequent demodulation filter 350. In the multiplication signal S4, intermediate-frequency signals having the low-frequency component (f1−f2) occupy a relatively large portion, and the multiplication signal S4 is input to the first intermediate-frequency mixer 15 for the I phase and the second intermediate-frequency mixer 17 for the Q phase. The demodulation filter 350 outputs the I-phase demodulation signal S6 and the Q-phase demodulation signal S8 that are proportional to the magnitude of the input multiplication signal S4. The magnetoresistive element 2 is configured to keep outputting the multiplication signal S4 having a constant level via the feedback signal line FB as in the third embodiment. Therefore, even if the input signal level of a microwave signal S1 including a multilevel symbol transmission signal received by the antenna element 101 varies due to a disturbance or other factors, the microwave receiver 500 can keep outputting an I-phase demodulation signal S6 and a Q-phase demodulation signal S8 having a constant level, and automatic gain control can be implemented.

Figure 9:
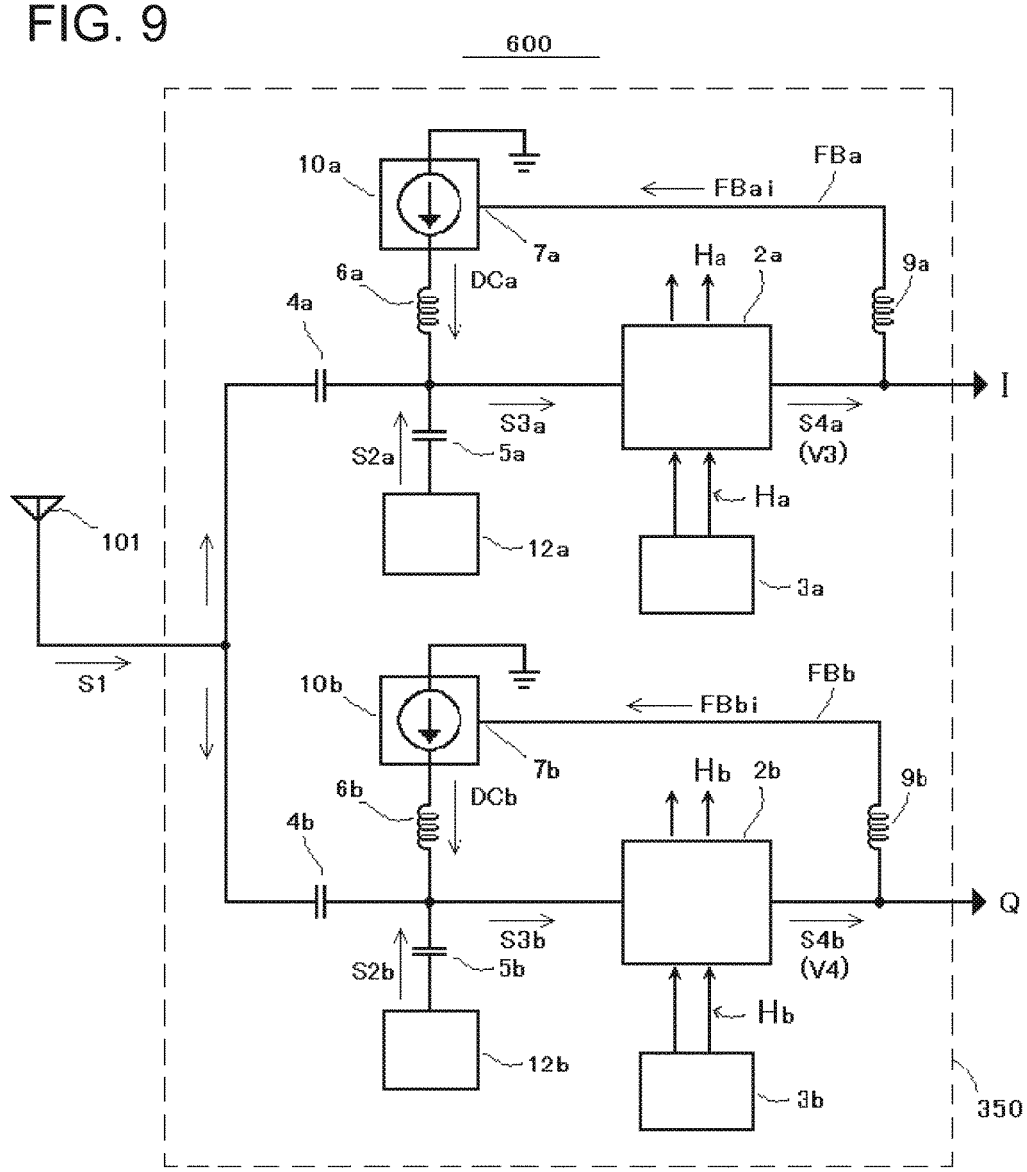
FIG. 9 is a circuit diagram of a microwave receiver according to a fifth embodiment of the present invention.

FIG. 9 is a circuit diagram of a microwave receiver 600 according to a fifth embodiment of the present invention. The microwave receiver 600 includes a magnetoresistive element 2a that functions as a frequency down-converter and an I-phase demodulation filter and a magnetoresistive element 2b that functions as a frequency down-converter and a Q-phase demodulation filter. That is, the magnetoresistive elements 2a and 2b are caused to function as direct-conversion-type mixers, which is a feature of the microwave receiver 600. In the microwave receiver 600, a microwave signal S1 includes a multilevel symbol transmission signal that is transmitted on two orthogonal carrier waves, namely, an I-phase carrier wave and a Q-phase carrier wave. The microwave signal S1 passes through capacitors 4a and 4b and is input to the magnetoresistive elements 2a and 2b respectively. The microwave receiver 600 further includes a local oscillator 12a that generates an I-phase local oscillation signal S2a having a frequency close to the center frequency of the multilevel symbol transmission signal and a local oscillator 12b that generates a Q-phase local oscillation signal S2b having a frequency equal to that of the I-phase local oscillation signal S2a and having a phase advancing ahead of that of the I-phase local oscillation signal S2a by 90°. The I-phase local oscillation signal S2a and the Q-phase local oscillation signal S2b pass through capacitors 5a and 5b and are input to the magnetoresistive elements 2a and 2b respectively. The microwave receiver 600 further includes DC bias current application units 10a and 10b that generate DC bias currents DCa and DCb respectively. The DC bias currents DCa and DCb pass through inductors 6a and 6b and are input to the magnetoresistive elements 2a and 2b respectively. When a signal S3a formed by combining the microwave signal S1, the I-phase local oscillation signal S2a, and the DC bias current DCa is input to the magnetoresistive element 2a, a multiplication signal S4a is generated. When a signal S3b formed by combining the microwave signal S1, the Q-phase local oscillation signal S2b, and the DC bias current DCb is input to the magnetoresistive element 2b, a multiplication signal S4b is generated. The multiplication signals S4a and S4b correspond to an I-phase demodulation signal output from the demodulation filter 350 and a Q-phase demodulation signal output from the demodulation filter 350 respectively. Note that an electric current associated with the microwave signal S1 is divided and the divided electric currents flow into the magnetoresistive elements 2a and 2b respectively.

An electric current associated with the multiplication signal S4a is divided into an electric current FBai that passes through an inductor 9a and a feedback signal line FBa and is injected into the DC bias current application unit 10a and an electric current that is output to a subsequent unit. From the multiplication signal S4a, a DC electromotive voltage V3 is extracted via the inductor 9a, and the DC electromotive voltage V3 is supplied to the DC bias current application unit 10a via the feedback signal line FBa. The DC bias current application unit 10a adjusts the DC bias current DCa so as to keep the DC electromotive voltage V3 constant. Therefore, even if the input signal level of a microwave signal S1 including a multilevel symbol transmission signal that is received by the antenna element 101 and is input to the magnetoresistive element 2a varies due to a disturbance or other factors, the magnetoresistive element 2a can keep outputting a multiplication signal S4a having a constant level, and automatic gain control can be implemented.

An electric current associated with the multiplication signal S4b is divided into an electric current FBbi that passes through an inductor 9b and a feedback signal line FBb and is injected into the DC bias current application unit 10b and an electric current that is output to a subsequent unit. From the multiplication signal S4b, a DC electromotive voltage V4 is extracted via the inductor 9b, and the DC electromotive voltage V4 is supplied to the DC bias current application unit 10b via the feedback signal line FBb. The DC bias current application unit 10b adjusts the DC bias current DCb so as to keep the DC electromotive voltage V4 constant. Therefore, even if the input signal level of a microwave signal S1 including a multilevel symbol transmission signal that is received by the antenna element 101 and is input to the magnetoresistive element 2b varies due to a disturbance or other factors, the magnetoresistive element 2b can keep outputting a multiplication signal S4b having a constant level, and automatic gain control can be implemented.

Figure 10:
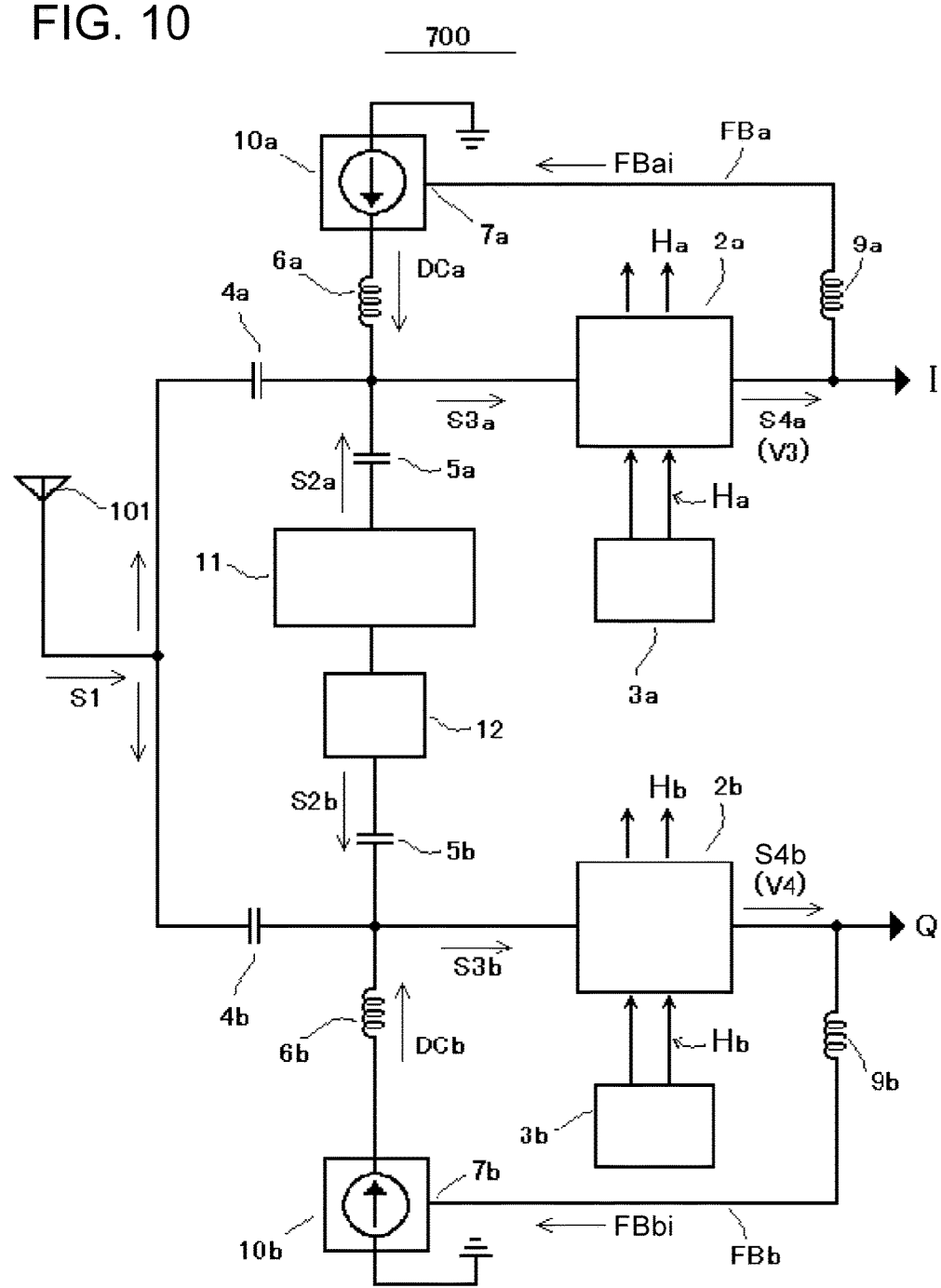
FIG. 10 is a circuit diagram of a microwave receiver according to a modification of the fifth embodiment of the present invention.

FIG. 10 is a circuit diagram of a microwave receiver 700 according to a modification of the fifth embodiment of the present invention. The microwave receiver 700 includes the magnetoresistive element 2a that functions as a frequency down-converter and an I-phase demodulation filter and the magnetoresistive element 2b that functions as a frequency down-converter and a Q-phase demodulation filter, as in the fifth embodiment. That is, the magnetoresistive elements 2a and 2b are caused to function as direct-conversion-type mixers. The modification is different from the fifth embodiment in that the local oscillators 12a and 12b for the I-phase and the Q-phase are replaced and one local oscillator 12 and a 90-degree phase shifter 11 are used instead. One oscillator serves as a signal source of the I-phase local oscillation signal S2a and the Q-phase local oscillation signal S2b. As a result, no frequency shift or the like occurs, and stability is achieved. As in the fifth embodiment, even if the input signal level of a microwave signal S1 including a multilevel symbol transmission signal that is received by the antenna element 101 and is input to the magnetoresistive elements 2a and 2b varies due to a disturbance or other factors, the magnetoresistive elements 2a and 2b can keep outputting multiplication output S4a and S4b having a constant level, and automatic gain control can be implemented.

Figure 11:
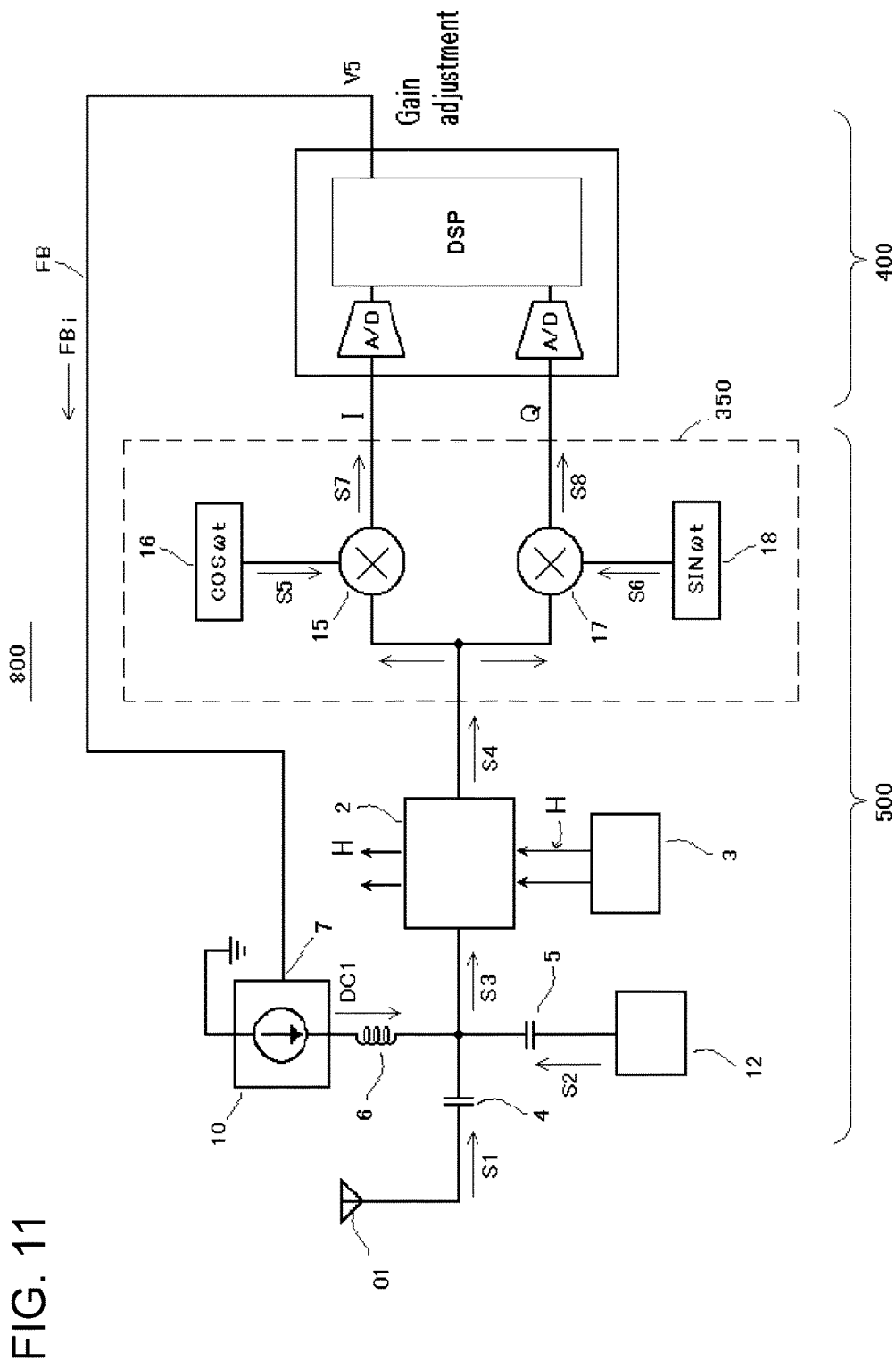
FIG. 11 is a circuit diagram of a microwave receiver (including a baseband controller) according to a sixth embodiment of the present invention.

FIG. 11 is a circuit diagram of a microwave receiver 800 according to a sixth embodiment of the present invention. The microwave receiver 800 is configured by partially modifying the circuitry of the microwave receiver 500 of the fourth embodiment in which the RF receiver and the demodulation filter are combined, and further includes a baseband controller 400. The I-phase demodulation signal S6 and the Q-phase demodulation signal S8 output from the demodulation filter 350 are input to the subsequent baseband controller 400. The circuitry of the microwave receiver 500 of the fourth embodiment in which the RF receiver and the demodulation filter are combined is partially modified as follows. In the configuration of the fourth embodiment, multiplication output S4 is generated by the magnetoresistive element 2, a portion of an electric current associated with the multiplication output S4 is guided to the inductor 9, and a DC electromotive voltage V2 extracted from the multiplication output S4 is supplied to the DC bias current application unit 10 via the inductor 9 and the feedback signal line FB. This configuration is changed so that a DC voltage V5 output from the baseband controller 400 is supplied to the DC bias current application unit 10 via the feedback signal line FB. A microwave signal S1 includes a multilevel symbol transmission signal that is transmitted on two orthogonal carrier waves, namely, an I-phase carrier wave and a Q-phase carrier wave, and the multilevel symbol transmission signal includes pilot symbols 42 (see FIG. 16) based on BPSK that are allocated to an information transmission frame based on a QAM scheme.

Figure 17:
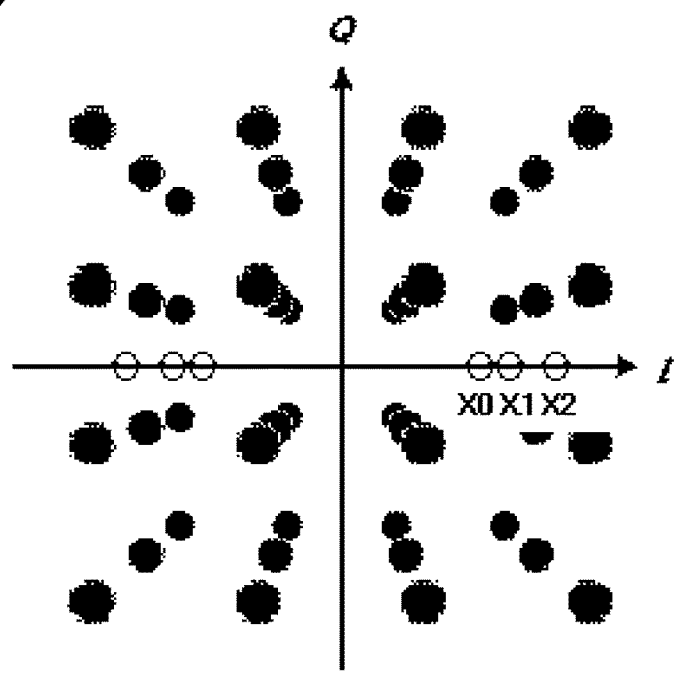
FIG. 17 is a constellation diagram illustrating amplitude fluctuations in 16QAM.
Figure 18:
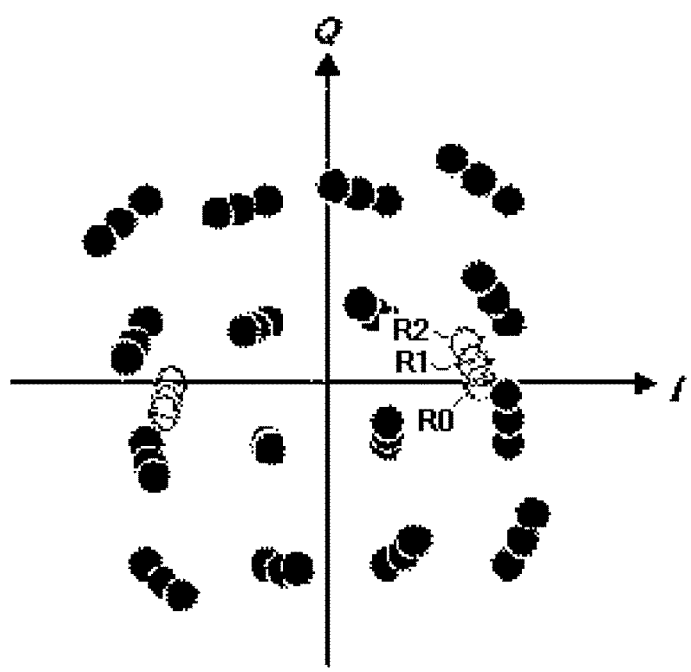
FIG. 18 is a constellation diagram illustrating phase angle fluctuations in 16QAM.
Figure 19:
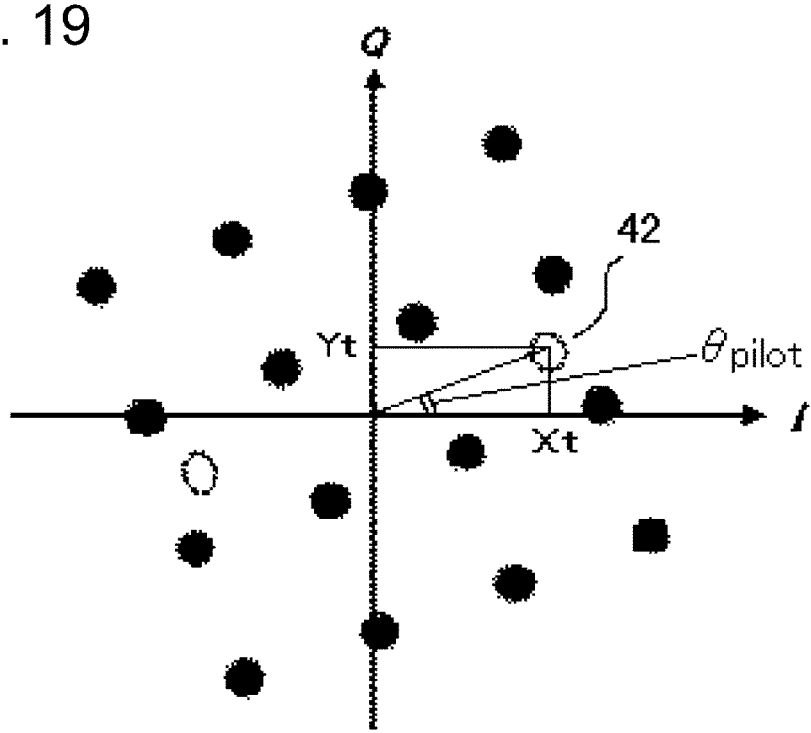
FIG. 19 is a diagram illustrating the components of a pilot symbol based on an I axis and a Q axis and the phase angle thereof in 16QAM.

The baseband controller 400 includes analog-to-digital converters and a digital signal processor (DSP). The analog-to-digital converters perform analog-to-digital conversion on the I-phase demodulation signal S6 and the Q-phase demodulation signal S8 for each time series and extract I-phase amplitude values X0, X1, X2, . . . , Xt and Q-phase amplitude values Y0, Y1, Y2, . . . , Yt respectively. The DSP arranges the I-phase amplitude values X0, X1, X2, . . . , Xt and the Q-phase amplitude values Y0, Y1, Y2, . . . , Yt on the basis of the time series, performs a correlation calculation for detecting a characteristic pattern, such as a guard interval, from the series of the values, locates the start position of an information transmission frame, and separates and extracts pilot symbols and data symbols representing information in the information transmission frame. In general, the microwave signal S1 received by the antenna element 101 has a distortion caused by some sort of external factor, and amplitude shifts as illustrated in FIG. 17, phase angle shifts as illustrated in FIG. 18, or both amplitude shifts and phase angle shifts are observed. Immediately after the pilot symbols in the information transmission frame have been extracted, the DSP performs the following two calculations using the instantaneous I-phase amplitude value Xt and the instantaneous Q-phase amplitude value Yt of one of the pilot symbols. The phase angle shift is calculated by using an expression θpilot=arctan(Yt/Xt), and the phase angle shift θpilot is obtained, as illustrated in FIG. 19. The present amplitude value of the pilot symbol is calculated by using an expression √(Xt*Xt+Yt*Yt), and the distance between the pilot symbol point 42 and the origin, that is, the I-phase amplitude value of the pilot symbol that includes an amplitude shift, is obtained, as illustrated in FIG. 19. Further, for gain feedback, the amplitude shift of the pilot symbol is calculated by using an expression √(Xt*Xt+Yt*Yt)−(specified value of I-phase amplitude value of pilot symbol), and the DC voltage V5, which is proportional to the calculated value, is generated. The DC voltage V5 is supplied to the DC bias current application unit 10 via the feedback signal line FB. The DC bias current application unit 10 is configured to adjust the DC bias current DC1 so as to keep the DC voltage V5 constant. Therefore, even if the input signal level of a microwave signal S1 received by the antenna element 101 varies due to a disturbance or other factors, the magnetoresistive element 2 can keep outputting an I-phase demodulation signal S6 and a Q-phase demodulation signal S8 having a constant level, and automatic gain control can be implemented.

The DSP uses the amplitude shift and the phase angle shift θpilot of a pilot symbol to make distortion corrections on data symbols representing information. As a result, the points of the data symbols representing information that are scattered due to a QAM scheme are reallocated to the correct positions. In order to demodulate a signal based on a QAM scheme, the DSP performs Viterbi error correction in which maximum likelihood detection taking into consideration the probability density is performed to thereby advance a multilevel quantification process. The microwave receiver 800 according to the sixth embodiment of the present invention enables the automatic gain control function, and therefore, the reception accuracy in multilevel symbol transmission based on a QAM scheme is stabilized, and the communication speed can be dramatically increased.

Figure 12:
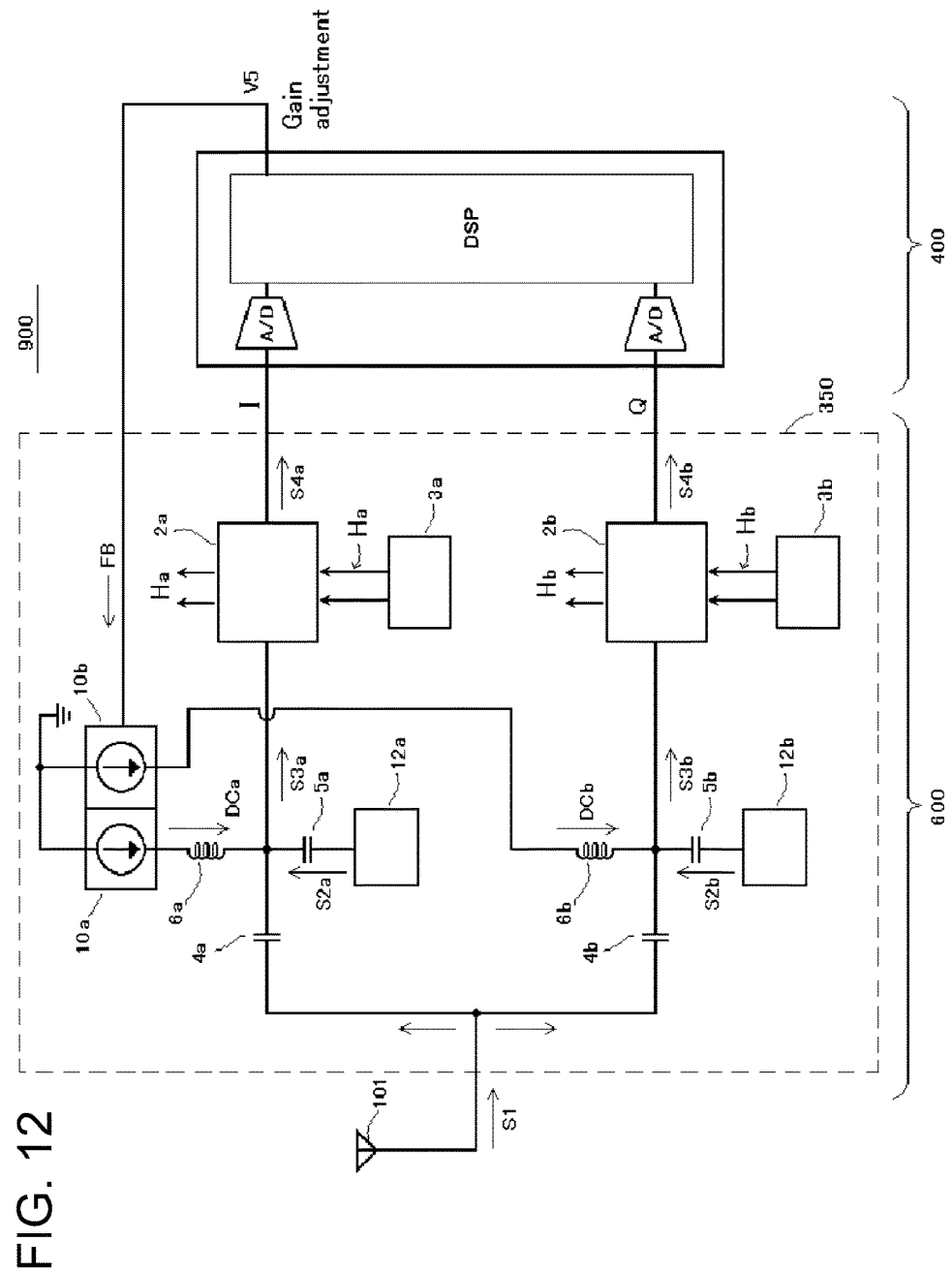
FIG. 12 is a circuit diagram of a microwave receiver (including the baseband controller) according to a seventh embodiment of the present invention.

FIG. 12 is a circuit diagram of a microwave receiver 900 according to a seventh embodiment of the present invention. The microwave receiver 900 is configured by partially modifying the circuitry of the microwave receiver 600 of the fifth embodiment in which the RF receiver and the demodulation filter are combined, and further includes the baseband controller 400 of the sixth embodiment. The I-phase demodulation signal S4a and the Q-phase demodulation signal S4b output from the demodulation filter 350 are input to the subsequent baseband controller 400. The circuitry of the microwave receiver 600 of the fifth embodiment in which the RF receiver and the demodulation filter are combined is partially modified as follows. In the configuration of the fifth embodiment, multiplication output S4a and S4b are generated by the magnetoresistive elements 2a and 2b, portions of electric currents associated with the multiplication output S4a and S4b are guided to the inductors 9a and 9b, and DC electromotive voltages V3 and V4 extracted from the multiplication output S4a and S4b are supplied to the DC bias current application units 10a and 10b via the inductors 9a and 9b and the feedback signal lines FBa and FBb respectively. This configuration is changed so that the DC voltage V5 output from the baseband controller 400 is supplied to the DC bias current application units 10a and 10b via the feedback signal line FB. A microwave signal S1 includes a multilevel symbol transmission signal that is transmitted on two orthogonal carrier waves, namely, an I-phase carrier wave and a Q-phase carrier wave, and the multilevel symbol transmission signal includes the pilot symbols 42 (see FIG. 16) based on BPSK that are allocated to an information transmission frame based on a QAM scheme.

The microwave receiver 900 includes the magnetoresistive elements 2a and 2b that function as direct-conversion-type mixers similarly as in the fifth embodiment. The baseband controller 400 generates the DC voltage V5 as in the sixth embodiment, and the DC voltage V5 is supplied to the DC bias current application units 10a and 10b via the feedback signal line FB. The DC bias current application units 10a and 10b are configured to adjust the DC bias currents DCa and DCb so as to keep the DC voltage V5 constant. Therefore, even if the input signal level of a microwave signal S1 received by the antenna element 101 varies due to a disturbance or other factors, the magnetoresistive elements 2a and 2b can keep outputting an I-phase demodulation signal S4a and a Q-phase demodulation signal S4b having a constant level, and automatic gain control can be implemented. The microwave receiver 900 according to the seventh embodiment of the present invention enables the automatic gain control function, and therefore, the reception accuracy in multilevel symbol transmission based on a QAM scheme is stabilized, and the communication speed can be dramatically increased.

Figure 13:
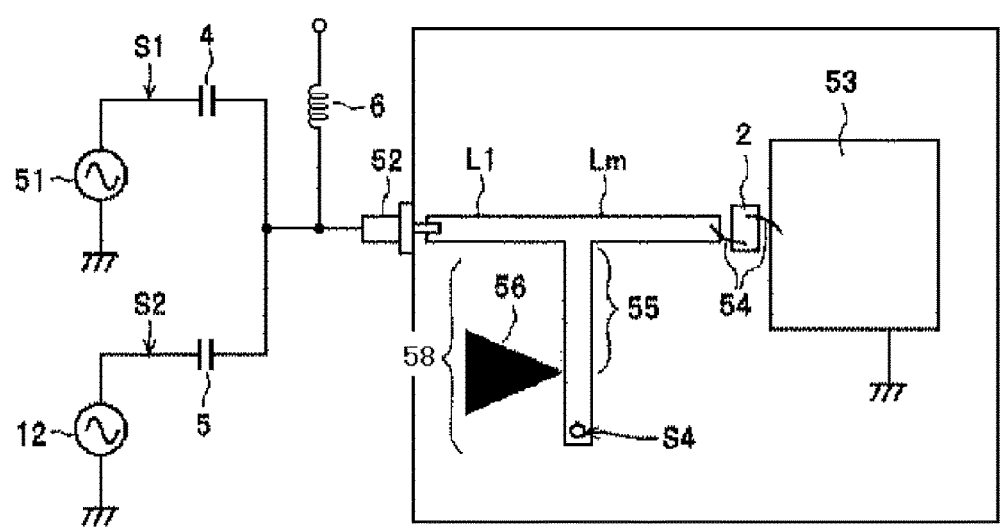
FIG. 13 is a connection diagram of a mixer evaluation tool equipped with the magnetoresistive element and an evaluation apparatus.

FIG. 13 illustrates an evaluation tool according to the embodiments of the present invention. In order to evaluate the mixing properties of the magnetoresistive element 2, which functions as a down-conversion-type mixer, a microwave signal S1, a local signal S2, and a multiplication signal S4 are observed. The microwave signal S1 is generated by a network analyzer 51 (model name 8720ES from Agilent), passes through the capacitor 4 (model name 1005 chip capacitor from TDK), and is input to a Sub Miniature Type A (SMA) terminal 52. The local signal S2 is generated by a local signal generator (model name 83620B from Agilent), which corresponds to the local oscillator 12, passes through the capacitor 5 (model name 1005 chip capacitor from TDK), and is input to the SMA terminal 52. A DC current DC1 is generated by a DC current source (model name R6144 from Advantest) not illustrated, which corresponds to the DC bias current application unit 10, passes through the inductor 6 for AC cutting, and is input to the SMA terminal 52. The input signals are injected into the microstrip lines of transmission lines L1 and Lm through the SMA terminal 52 of the evaluation tool. The magnetoresistive element 2 is connected between the transmission line Lm and a ground plane 53 by using bonding wires 54. The evaluation tool further includes a λ/4 stub line 55 connected to the transmission lines L1 and Lm and a sector-shaped λ/4 stub 56 connected to the λ/4 stub line 55, which constitute a desired frequency cut filter 58, and causes the input signals S1 and S2 to undergo attenuation until the signals reach an extraction end S4 through which a multiplication signal is extracted. The symbol λ represents the wavelength of the local signal S2 (frequency f2). Among signals (f1+f2), (f1−f2), 2×f1, 2×f2, 3×f1, 3×f2, and so on generated by the magnetoresistive element 2, the frequency components f1 and f2 are signals extremely larger than the other frequency components, and therefore, the frequency components f1 and f2 need to undergo sufficient attenuation.

Figure 14A:
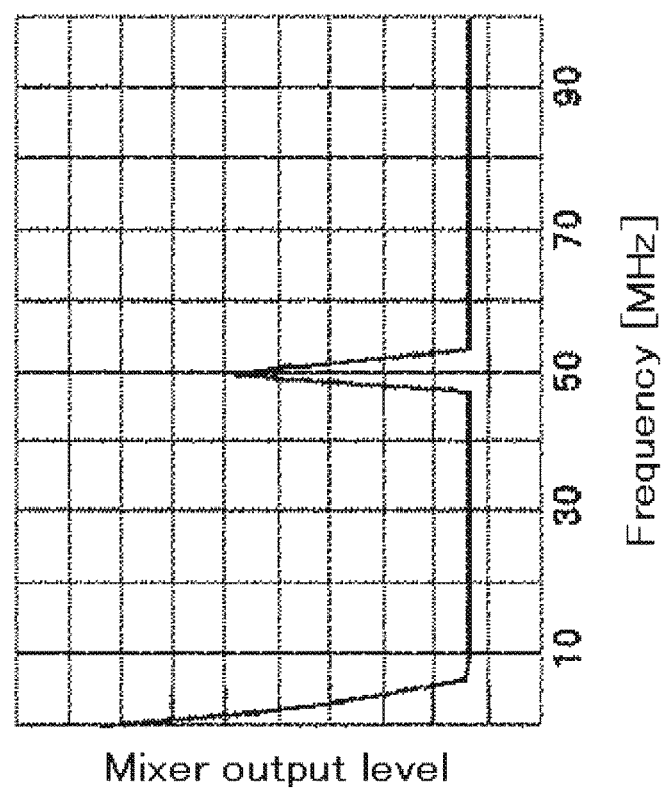
FIGS. 14A and 14B illustrate the mixing properties of the magnetoresistive element where
Figure 14B:
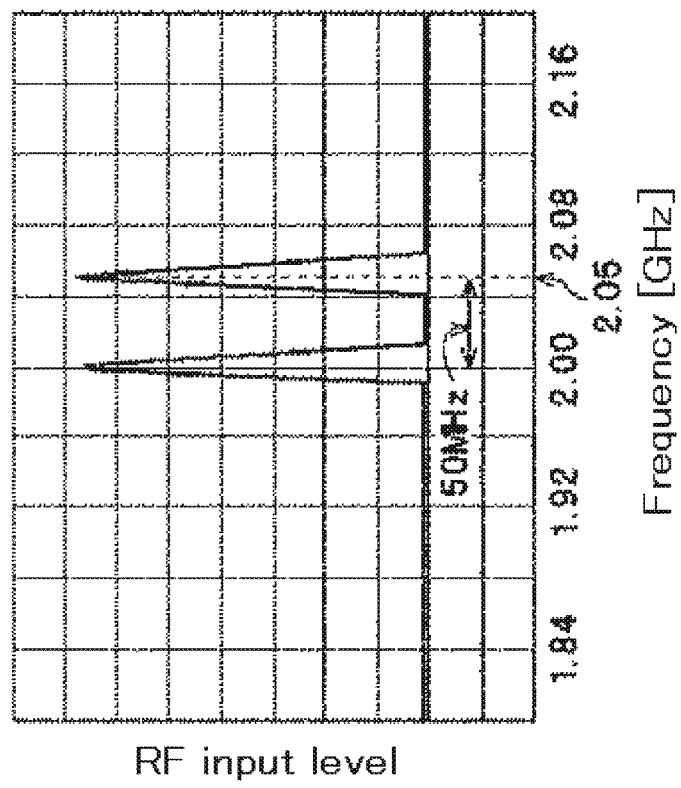

According to an experiment using the evaluation tool according to the embodiments of the present invention, when an RF signal S1 (having a frequency f1 equal to 2.05 GHz) and a local signal S2 (having a frequency f2 equal to 2.0 GHz) are input, as illustrated in FIG. 14A, the magnetoresistive element 2 can generate a multiplication signal S4 (having a frequency (f1−f2) equal to 50 MHz), as illustrated in FIG. 14B. The magnetoresistive element 2 can further increase the multiplication signal to a large degree by applying a DC bias current of about 0.1 mA to 0.3 mA.

A method for implementing a PSK scheme by using the magnetoresistive element 2 as a mixer in the embodiments of the present invention is described. FIG. 15 includes example constellation diagrams (rectangular coordinates based on an I axis and a Q axis) of BPSK, QPSK, and 8PSK, which are PSK schemes. A carrier wave for information transmission needs to have a constant frequency and a constant amplitude, and only the phase thereof needs to be changed. The resonance frequency of the magnetoresistive element 2, which functions as a mixer, is determined in accordance with the strength of a magnetic field applied to the free magnetic layer. Therefore, in a case of a fast frequency change in a microwave signal S1 received by the antenna element 101, for example, the strength of the magnetic field needs to be adjusted, and the resonance frequency might not follow the strength of the magnetic field. In PSK schemes, the amplitude is kept constant, and therefore, the magnetoresistive element 2 is expected to stably operate as a mixer.

Figure 16:
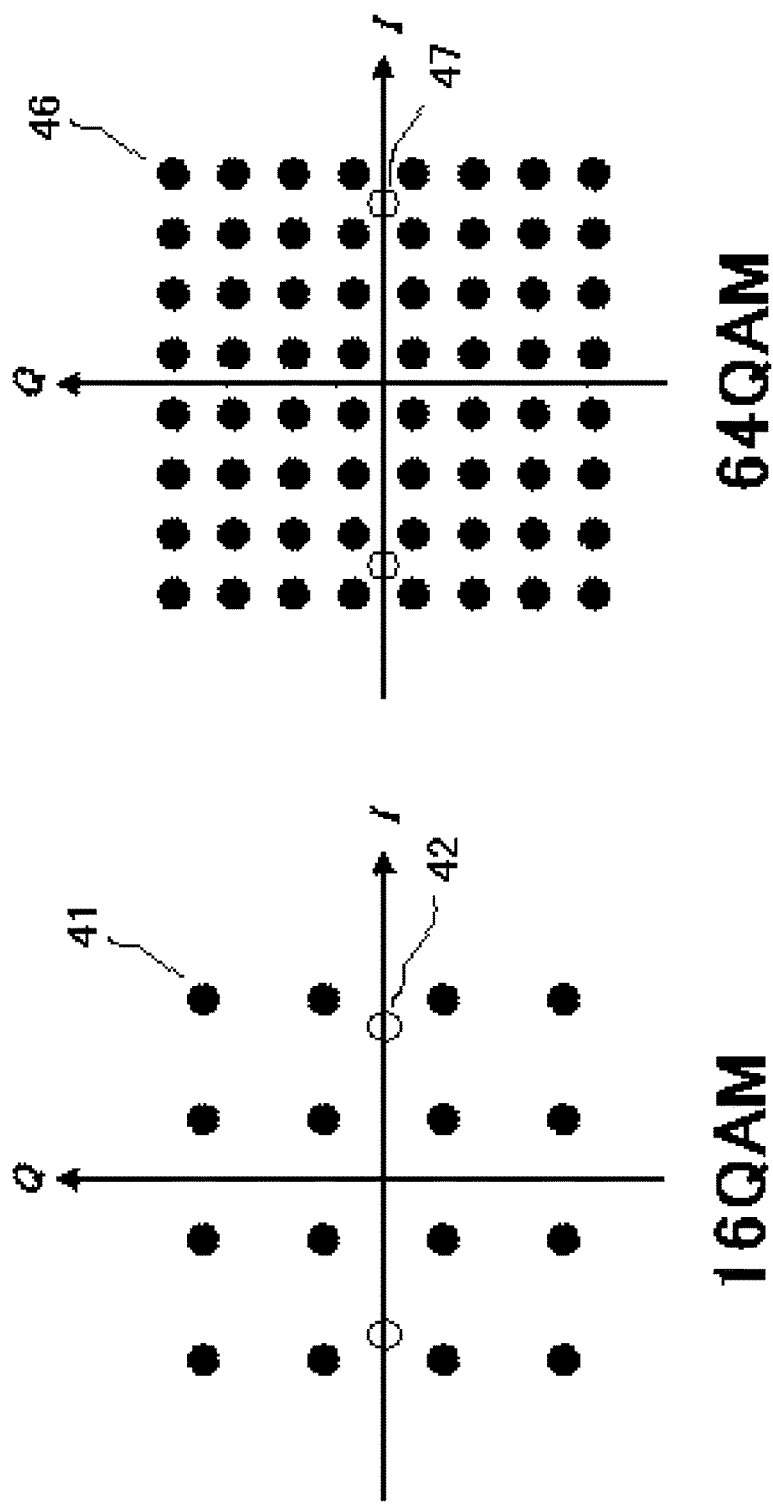
FIG. 16 includes constellation diagrams of quadrature amplitude modification (QAM) schemes, namely, 16 quadrature amplitude modulation (16QAM) and 64 quadrature amplitude modulation (64QAM).

A method for implementing a QAM scheme by using the magnetoresistive element 2 as a mixer in the embodiments of the present invention is described. FIG. 16 includes constellation diagrams (rectangular coordinates based on an I axis and a Q axis) of 16QAM and 64QAM, which are QAM schemes, in which information data symbols 41 (and 46) represented by small black circles and pilot symbols 42 (and 47) represented by small white circles are present. Pilot symbols are special symbols that do not include information and are allocated at the head of a transmission signal frame, and data symbols are allocated behind the pilot symbols. The pilot symbols are used to check the distortion state of a transmission line. For data symbols, multilevel quantification can be implemented with high accuracy by using pilot symbol correction. FIG. 17 and FIG. 18 represent transmission line distortions in 16QAM, which is a QAM scheme. FIG. 17 illustrates an example in which a tunnel, an obstacle, or the like is present on the transmission line and causes amplitude fluctuations, and the pilot symbols and data symbols move closer to the origin of the graph or move away from the origin. In order to quantitatively determine the amplitude shift (amount of fluctuation) of a pilot symbol, the points X0, X1, and X2 are plotted on the I axis, the distance by which the pilot symbol moves away from the original position of the pilot symbol (specified amplitude value) is measured, and calculation processing is performed. FIG. 18 illustrates an example in which the transmission distance is affected by reflection or a roundabout due to a building, the Doppler effect, or other external factors, resulting in phase angle fluctuations, and the pilot symbols move in a circular pattern on the rectangular coordinates based on the I phase and the Q phase. In order to quantitatively determine the phase angle shift (amount of fluctuation) of a pilot symbol, the points R0, R1, and R2 are plotted, the distance by which the pilot symbol moves away from the original position of the pilot symbol is measured, and calculation processing is performed. FIG. 19 illustrates a process in which the I-phase amplitude value Xt and the Q-phase amplitude value Yt of a pilot symbol are extracted and the phase angle shift is calculated by using the expression θpilot=arctan(Yt/Xt). Although the phase angle shift can be corrected by generating a DC voltage that corresponds to the phase angle shift, using a feedback signal line, and providing the local oscillator 12 of the voltage-control-oscillator (VCO) type, a detailed description thereof is omitted.

Figure 20:
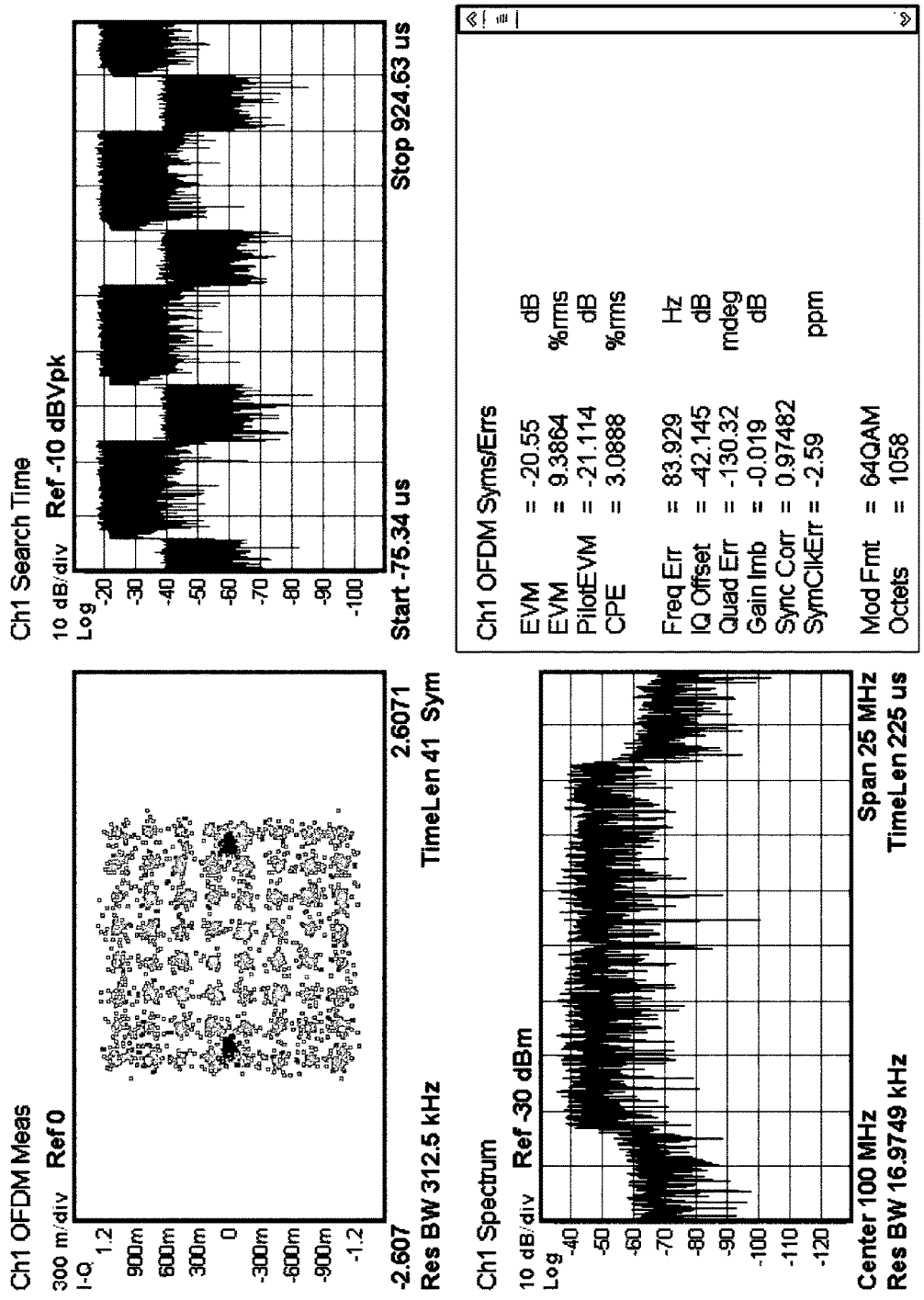
FIG. 20 illustrates the results of an experiment in which an evaluation tool for evaluating the mixing properties of the magnetoresistive element is used and an orthogonal frequency-division multiplexing (OFDM) wave, which is a 54 Mbps signal wave based on the 64QAM quadrature amplitude modulation scheme, is supplied.

FIG. 20 illustrates the results of an experiment in which an evaluation tool equipped with the magnetoresistive element 2 is used and an OFDM wave, which is a 54 Mbps microwave signal based on the 64QAM quadrature amplitude modulation scheme, is supplied. The screen split into quarters is a monitor screen displayed on an error vector measurements (EVM) evaluation apparatus (model name N9020A from Agilent). The constellation diagram of the 64QAM signal is displayed on the upper left portion, the state of the OFDM wave in the time domain is displayed on the upper right portion, the state of the OFDM wave in the frequency domain is displayed on the lower left portion, and the calculated values obtained from the EVM evaluation are displayed on the lower right portion. In the constellation diagram of the 64QAM signal, 64 information data symbols and two pilot symbols highlighted in the vicinity of the I axis are observed. Note that measurement apparatuses used in the experiment include a special function oscillator (model name N5182A from Agilent), which corresponds to the network analyzer 51, the local oscillator 12 (model name 83620B from Agilent), the DC current source (model name R6144 from Advantest), which corresponds to the DC bias current application unit 10, the microwave receiver 200 illustrated in FIG. 6, and the above-described EVM evaluation apparatus (model name N9020A from Agilent). The special function oscillator (network analyzer 51) generates an OFDM wave S1, the local oscillator (local signal generator) 12 generates a local signal S2, and the DC current source (DC bias current application unit 10) generates a DC bias current DC1. The OFDM wave S1, the local signal S2, and the DC bias current DC1 are injected into the microstrip lines L1 and Lm through the SMA terminal 52 of the evaluation tool and are applied to the magnetoresistive element 2. The magnetoresistive element 2 functions as a down-conversion-type mixer and generates a multiplication signal S4. The multiplication signal S4 is read by the EVM evaluation apparatus, undergoes OFDM demodulation in the EVM evaluation apparatus, that is, undergoes a correlation process for guard interval extraction and a fast Fourier transform (FFT) conversion calculation and passes through I-phase and Q-phase demodulation filters, and is projected as an X-Y Lissajou's figure. As a result of the experiment, the constellation diagram of the 64QAM signal can be reproduced by the magnetoresistive element 2, which functions as a mixer, and an EVM value of −20.55 dB is obtained. With the modulation/demodulation property of the magnetoresistive element 2, the reception performance of the OFDM wave, which is a 54 Mbps microwave signal based on the 64QAM quadrature amplitude modulation scheme, has been verified for the first time. Further, it has been found that the phase following capability and the amplitude following capability are highly likely to be achieved.

The microwave receivers have been described in the above-described embodiments; however, the present invention is not limited to the microwave receivers. Needless to say, it is obvious that, with a configuration similar to those in the above-described embodiments, a magnetoresistive device that can be used as a filter, a frequency converter, a gain controller, an oscillator, a diode detector, and so on can be implemented, for example.

What is claimed is:

1. A microwave receiver comprising:
a magnetoresistive element to which a microwave signal is input,
the magnetoresistive element including a free magnetic layer, a fixed magnetic layer, and a nonmagnetic spacer layer interposed between the free magnetic layer and the fixed magnetic layer;
a magnetic field application unit that applies a magnetic field to the free magnetic layer; and
a DC bias current application unit that applies a DC bias current to the magnetoresistive element,
the DC bias current application unit including an input terminal, wherein
the DC bias current is varied by adjusting a DC voltage that is applied to the DC bias current application unit via the input terminal,
the magnetoresistive element detects the microwave signal and generates a first DC electromotive voltage,
an electric current associated with the first DC electromotive voltage is divided into an electric current that passes through an inductor and a feedback signal line and is injected into the DC bias current application unit and an electric current that is output to a subsequent circuit,
the first DC electromotive voltage is supplied to the DC bias current application unit via the inductor and the feedback signal line, and
the DC bias current application unit adjusts the DC bias current so as to keep the first DC electromotive voltage constant.

2. The microwave receiver according to claim 1, further comprising:
a demodulation filter that includes the magnetoresistive element, the DC bias current application unit and a local wave generator wherein the local wave generator generates an I-phase local wave having a local wave frequency different from a frequency of the multilevel symbol transmission signal and a Q-phase local wave having the local wave frequency, wherein
the magnetoresistive element is comprised of a first magnetoresistive element and a second magnetoresistive element,
the DC bias current application unit is comprised of a first bias current application unit and a second bias current application unit,
the microwave signal includes a multilevel symbol transmission signal that is transmitted on two orthogonal carrier waves comprising an I-phase carrier wave and a Q-phase carrier wave,
the first DC bias current application unit applies to the first magnetoresistive element a first DC bias current as the DC bias current,
the second DC bias current application unit applies to the second magnetoresistive element a second DC bias current as the DC bias current,
the I-phase local wave is input to the first magnetoresistive element,
the first magnetoresistive element generates a first DC electromotive voltage when outputting an I-phase demodulation signal obtained by multiplying the multilevel symbol transmission signal with the I-phase local wave,
the Q-phase local wave is input to the second magnetoresistive element,
the second magnetoresistive element generates a second DC electromotive voltage when outputting a Q-phase demodulation signal obtained by multiplying the multilevel symbol transmission signal with the Q-phase local wave,
an electric current associated with the I-phase demodulation signal is divided into an electric current that passes through a first inductor and a first feedback signal line and is injected into the first DC bias current application unit and an electric current that is output to a first subsequent circuit,
the first DC electromotive voltage is supplied to the first DC bias current application unit via the first inductor and the first feedback signal line,
the first DC bias current application unit adjusts the first DC bias current so as to keep the first DC electromotive voltage constant,
an electric current associated with the Q-phase demodulation signal is divided into an electric current that passes through a second inductor and a second feedback signal line and is injected into the second DC bias current application unit and an electric current that is output to a second subsequent circuit,
the second DC electromotive voltage is supplied to the second DC bias current application unit via the second inductor and the second feedback signal line, and
the second DC bias current application unit adjusts the second DC bias current so as to keep the second DC electromotive voltage constant.

3. A microwave receiver comprising:
a magnetoresistive element to which a microwave signal is input,
the magnetoresistive element including a free magnetic layer, a fixed magnetic layer, and a nonmagnetic spacer layer interposed between the free magnetic layer and the fixed magnetic layer;
a magnetic field application unit that applies a magnetic field to the free magnetic layer; and
a DC bias current application unit that applies a DC bias current to the magnetoresistive element,
the DC bias current application unit including an input terminal, wherein
the DC bias current is varied by adjusting a DC voltage that is applied to the DC bias current application unit via the input terminal,
the microwave signal includes a multilevel symbol transmission signal that is transmitted on two orthogonal carrier waves comprising an I-phase carrier wave and a Q-phase carrier wave,
the microwave receiver further comprises a local oscillator that generates a local wave having a frequency different from a frequency of the multilevel symbol transmission signal,
the local wave is input to the magnetoresistive element,
the magnetoresistive element generates a DC electromotive voltage when outputting a multiplication signal obtained by multiplying the multilevel symbol transmission signal by the local wave,
an electric current associated with the multiplication signal is divided into an electric current that passes through an inductor and a feedback signal line and is injected into the DC bias current application unit and an electric current that is output to a subsequent circuit,
the DC electromotive voltage is supplied to the DC bias current application unit via the inductor and the feedback signal line, and
the DC bias current application unit adjusts the DC bias current so as to keep the DC electromotive voltage constant.

4. The microwave receiver according to claim 3, further comprising:
a demodulation filter, wherein
the multiplication signal is input to the demodulation filter,
the demodulation filter includes a first intermediate-frequency oscillator, a second intermediate-frequency oscillator, a first intermediate-frequency mixer, and a second intermediate-frequency mixer, the first intermediate-frequency oscillator generating an I-phase oscillation signal having a first frequency that is equal to a frequency difference between the multilevel symbol transmission signal and the local wave, the second intermediate-frequency oscillator generating a Q-phase oscillation signal having the first frequency,
the first intermediate-frequency mixer outputs an I-phase demodulation signal obtained by multiplying a signal included in the multiplication signal and having the first frequency with the I-phase oscillation signal, and
the second intermediate-frequency mixer outputs a Q-phase demodulation signal obtained by multiplying a signal included in the multiplication signal and having the first frequency with the Q-phase oscillation signal.

5. A microwave receiver comprising:
a magnetoresistive element to which a microwave signal is input,
the magnetoresistive element including a free magnetic layer, a fixed magnetic layer, and a nonmagnetic spacer layer interposed between the free magnetic layer and the fixed magnetic layer;
a magnetic field application unit that applies a magnetic field to the free magnetic layer; and
a DC bias current application unit that applies a DC bias current to the magnetoresistive element,
the DC bias current application unit including an input terminal, wherein
the DC bias current is varied by adjusting a DC voltage that is applied to the DC bias current application unit via the input terminal,
the microwave signal includes a multilevel symbol transmission signal that is transmitted on two orthogonal carrier waves comprising an I-phase carrier wave and a Q-phase carrier wave,
the multilevel symbol transmission signal includes a pilot symbol based on BPSK that is allocated to an information transmission frame based on a quadrature amplitude modulation scheme,
the microwave receiver further comprises a local oscillator, a demodulation filter, and a baseband controller, the local oscillator generating a local wave having a frequency different from a frequency of the multilevel symbol transmission signal,
the local wave is input to the magnetoresistive element,
the magnetoresistive element outputs a multiplication signal obtained by multiplying the multilevel symbol transmission signal by the local wave,
the multiplication signal is input to the demodulation filter,
the demodulation filter includes a first intermediate-frequency oscillator, a second intermediate-frequency oscillator, a first intermediate-frequency mixer, and a second intermediate-frequency mixer, the first intermediate-frequency oscillator generating an I-phase oscillation signal having a first frequency that is equal to a frequency difference between the multilevel symbol transmission signal and the local wave, the second intermediate-frequency oscillator generating a Q-phase oscillation signal having the first frequency,
the first intermediate-frequency mixer outputs an I-phase demodulation signal obtained by multiplying a signal included in the multiplication signal and having the first frequency with the I-phase oscillation signal,
the second intermediate-frequency mixer outputs a Q-phase demodulation signal obtained by multiplying a signal included in the multiplication signal and having the first frequency with the Q-phase oscillation signal,
the baseband controller includes an analog-to-digital converter and a digital signal processor,
the analog-to-digital converter performs analog-to-digital conversion on the I-phase demodulation signal and the Q-phase demodulation signal,
the digital signal processor extracts an I-phase amplitude value of the pilot symbol on the basis of the I-phase demodulation signal and the Q-phase demodulation signal subjected to the analog-to-digital conversion and outputs a DC voltage corresponding to the I-phase amplitude value,
the DC voltage is supplied to the DC bias current application unit via a feedback signal line, and
the DC bias current application unit adjusts the DC bias current so as to keep the DC voltage constant.

* * * * *